United States Patent
Liu et al.

(10) Patent No.: US 11,044,706 B2
(45) Date of Patent: Jun. 22, 2021

(54) CONTROL CHANNEL TRANSMISSION METHOD AND RELATED APPARATUSES

(71) Applicant: Huawei Technologies Co., Ltd., Shenzhen (CN)

(72) Inventors: Yun Liu, Shenzhen (CN); Jian Wang, Beijing (CN); Da Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/500,965

(22) PCT Filed: Jun. 16, 2017

(86) PCT No.: PCT/CN2017/088790
§ 371 (c)(1),
(2) Date: Oct. 4, 2019

(87) PCT Pub. No.: WO2018/184295
PCT Pub. Date: Oct. 11, 2018

(65) Prior Publication Data
US 2020/0037308 A1    Jan. 30, 2020

(30) Foreign Application Priority Data
Apr. 7, 2017   (CN) .......................... 201710225316.4

(51) Int. Cl.
*H04W 72/04* (2009.01)
*H04B 1/69* (2011.01)
(Continued)

(52) U.S. Cl.
CPC .......... *H04W 72/0413* (2013.01); *H04B 1/69* (2013.01); *H04L 5/0048* (2013.01); *H04W 72/044* (2013.01)

(58) Field of Classification Search
CPC ........... H04W 72/0413; H04W 72/044; H04W 28/00; H04B 1/69; H04L 5/0048; H04L 5/0094; H04L 5/0053; H04L 5/0051
See application file for complete search history.

(56) References Cited

U.S. PATENT DOCUMENTS

2002/0029325 A1   3/2002   Murayama et al.
2015/0092702 A1   4/2015   Chen et al.
(Continued)

FOREIGN PATENT DOCUMENTS

CN   102196570 A   9/2011
CN   102546134 A   7/2012
(Continued)

OTHER PUBLICATIONS

"New PUCCH format Design to Support UCI Transmission for up to 32 Component Carriers," Agenda Item: 7.2.2.1.1, Source: Huawei, HiSilicon, Document for: Discussion/Decision, 3GPP TSG RAN WG1 Meeting #82, R1-153770, Aug. 24-28, 2015, 4 pages.

*Primary Examiner* — Harry H Kim
(74) *Attorney, Agent, or Firm* — Slater Matsil, LLP

(57) ABSTRACT

A control channel transmission method, including receiving, by a first device, configuration information, where the configuration information indicates a time-frequency resource configured for a control channel, where the time-frequency resource comprises N symbols and M physical resource blocks (PRBs), where N is greater than or equal to 1 and less than or equal to 12, where M is greater than or equal to 1, where the control channel comprises a demodulation reference signal (DMRS) and uplink control information (UCI), and where the M PRBs are contiguous or non-contiguous, and transmitting the DMRS on at least one of the N symbols using a target PRB, where the target PRB comprises at least one of the M PRBs.

16 Claims, 25 Drawing Sheets

(51) Int. Cl.
*H04L 5/00* (2006.01)
*H04W 28/00* (2009.01)

(56) References Cited

U.S. PATENT DOCUMENTS

| | | |
|---|---|---|
| 2015/0208402 A1 | 7/2015 | Hwang et al. |
| 2015/0282158 A1* | 10/2015 | Chen .................... H04L 5/0007 370/329 |
| 2015/0289234 A1 | 10/2015 | Zhao et al. |
| 2016/0127102 A1 | 5/2016 | Kim et al. |
| 2018/0206224 A1 | 7/2018 | Hwang et al. |
| 2018/0270807 A1* | 9/2018 | Salem ................... H04L 5/0048 |
| 2019/0356446 A1* | 11/2019 | Kim ....................... H04L 5/0053 |
| 2019/0364585 A1* | 11/2019 | Lee ....................... H04W 72/12 |
| 2019/0386795 A1* | 12/2019 | Matsumura ........... H04L 5/0012 |
| 2020/0107317 A1* | 4/2020 | Ryu ................. H04W 72/0413 |

FOREIGN PATENT DOCUMENTS

| | | |
|---|---|---|
| CN | 104202123 A | 12/2014 |
| CN | 104641577 A | 5/2015 |
| CN | 105594286 A | 5/2016 |
| CN | 106105088 A | 11/2016 |
| WO | 2017026814 A1 | 2/2017 |

\* cited by examiner

CONTROL CHANNEL TRANSMISSION METHOD AND RELATED APPARATUSES

CROSS REFERENCE TO RELATED APPLICATIONS

This application is a national stage of International Application No. PCT/CN2017/088790, filed on Jun. 16, 2017, which claims priority to Chinese Patent Application No. 201710225316.4, filed on Apr. 7, 2017. Both of the aforementioned applications are hereby incorporated by reference in their entireties.

TECHNICAL FIELD

A system and method for control channel transmission for dissimilar communications technologies.

BACKGROUND

Over the past decade, long term evolution (LTE) standards proposed by the third generation partnership project (3GPP) organization have been widely used worldwide and referred to as $4^{th}$ generation (4G) communications technologies. In the 4G communications technologies, an uplink control channel (or referred to as uplink control signalling) can be transmitted throughout a subframe (usually including 14 symbols).

Other communications technologies may not be the same as LTE/LTE advanced (LTE-A). For example, only a 1-symbol or 2-symbol time domain resource is supported on an uplink control channel (or referred to as uplink control signalling) in a $5^{th}$ generation (5G) access network technology (NR). Therefore, how to transmit a control channel in another communications technology (for example, a future communications technology) currently becomes a research topic

SUMMARY OF THE INVENTION

In view of this, an objective of embodiments of this application is to provide a control channel transmission method and related apparatuses, to implement control channel transmission in another communications technology.

To achieve the foregoing objective, the embodiments of this application provide the following technical solutions.

According to one aspect, an embodiment of this application provides a control channel transmission method, including generating and sending, by a second device, configuration information, where the configuration information is used to indicate a time-frequency resource configured for a control channel, the time-frequency resource includes N symbols and M physical resource blocks (PRBs), N is not less than 1 and not greater than 12, M is not less than 1, the control channel includes a demodulation reference signal (DMRS) and uplink control information (UCI), and the M PRBs are contiguous or non-contiguous, sending, by a first device, the control channel on the time-frequency resource after receiving the configuration information, and receiving, by the second device, the control channel on the time-frequency resource. Specifically, the first device transmits the DMRS (or conversely, transmits the UCI) on at least one of the N symbols by using a target PRB, and the target PRB includes at least one of the M PRBs. A distribution structure of the DMRS and the UCI on the time-frequency resource may be predefined. For example, the distribution structure of the DMRS and the UCI on the time-frequency resource may be specified in a protocol. Certainly, the second device may configure, by using signalling, the distribution structure of the DMRS and the UCI on the time-frequency resource for the first device according to an actual situation. It can be learned that in the solution provided in this application, the control channel may be transmitted by using the N symbols and the M PRBs (neither N nor M is less than 1), and the control channel includes the DMRS and the UCI. Further, in the solution provided in this application, the DMRS is transmitted in a length of at least one symbol by using the target PRB, so as to implement control channel transmission in another communications technology. In addition, to mitigate interference, the second device may indicate a first spreading sequence and a second spreading sequence (the first spreading sequence and the second spreading sequence may be the same or different) to the first device. The first device may perform spectrum spreading on the DMRS by using the first spreading sequence, and perform spectrum spreading on the UCI by using the second spreading sequence. In addition, the first spreading sequence and the second spreading sequence each are orthogonal to a spreading sequence used by a neighboring cell. In this way, the control channel is not interfered with by the neighboring cell.

In a possible design, the N symbols include at least a first symbol, and the transmitting the DMRS on at least one symbol by using a target PRB includes transmitting the DMRS in a length of the first symbol by using the target PRB. In a type of distribution structure, it may further be designed as follows. The UCI may be transmitted in the length of the first symbol by using an RPB contiguous to the target PRB. In this way, the DMRS and the UCI may be distributed alternately on PRBs, all PRBs around a PRB used to transmit the DMRS may be decoded with reference to a channel estimation result of the DMRS on the PRB, and a quantity of PRBs used to transmit the UCI may be maximized. In addition, the distribution structure of the DMRS and the UCI in the length of the first symbol may further include the following. The DMRS is transmitted by using the first PRB in the M PRBs, or the DMRS is transmitted by using the first PRB and the last PRB in the M PRBs, or the DMRS is transmitted by using a PRB other than the first PRB and the last PRB. The DMRS and the UCI each occupy all 12 subcarriers of an entire PRB for transmission. In this case, the second device receives the DMRS or the UCI on a corresponding PRB based on a specific distribution structure. This embodiment provides various distribution structures of the DMRS and the UCI on the first symbol, thereby better implementing control channel transmission.

In a possible design, the M PRBs may be divided into at least one PRB group, and PRB groups may be contiguous or non-contiguous in frequency domain. Each PRB group may include the target PRB. In each PRB group, for the distribution structure of the DMRS and the UCI on the time-frequency resource, refer to the foregoing descriptions. For example, the first device transmits the DMRS on a PRB whose sequence number (index number/identifier) is an odd number in the PRB group, and transmits the UCI on a PRB whose sequence number (index number/identifier) is an even number. For another example, the first device transmits the UCI on a PRB whose sequence number (index number/identifier) is an odd number in the PRB group, and transmits the DMRS on a PRB whose sequence number (index number/identifier) is an even number. The DMRS and the UCI each occupy all 12 subcarriers of an entire PRB for transmission. This embodiment provides various distribution structures of the DMRS and the UCI on the first symbol, thereby better implementing control channel transmission.

In a possible design, in the length of the first symbol, the UCI may be transmitted by using some subcarriers of another PRB, and the DMRS may be transmitted by using the other subcarriers. The another PRB includes at least one of the M PRBs, and the another PRB does not include the target PRB. For example, the first device may transmit the DMRS on the first PRB, transmit the UCI on some subcarriers of another PRB, and transmit the DMRS on the other subcarriers. For another example, the first device may transmit the DMRS on the first PRB and the last PRB, transmit the UCI on some subcarriers of another PRB, and transmit the DMRS on the other subcarriers. For another example, the first device may transmit the DMRS on a PRB other than the first PRB and the last PRB, transmit the UCI on some subcarriers of another PRB, and transmit the DMRS on the other subcarriers. Specifically, the subcarriers used to transmit the DMRS and the subcarriers used to transmit the UCI may be predefined, for example, may be specified in a protocol. Certainly, a base station may configure this for a terminal according to an actual situation by using signalling. Alternatively, the N symbols further include a second symbol. In the length of the second symbol, the UCI may also be transmitted by using some subcarriers of the another PRB, and the DMRS may also be transmitted by using the other subcarriers.

In a possible design, the N symbols further include a second symbol. In an example, a distribution structure of the DMRS and the UCI on the second symbol may be obtained by directly replicating the distribution structure of the DMRS and the UCI on the first symbol. In other words, distribution structures of the DMRS and the UCI on the two symbols are the same. In another example, a distribution structure of the DMRS and the UCI on the second symbol may be any one of the distribution structures described above, and is not necessarily the same as the distribution structure of the DMRS and the UCI on the first symbol. In still another example, a distribution structure of the DMRS and the UCI on the second symbol may be opposite to the distribution structure of the DMRS and the UCI on the first symbol. The "opposite" means that a PRB or a subcarrier used to transmit the DMRS on the first symbol is used to transmit the UCI on the second symbol. In still another example, the UCI may be transmitted in a length of the second symbol by using all PRBs. This embodiment provides various distribution structures of the DMRS and the UCI on the second symbol, thereby better implementing control channel transmission.

In a possible design, considering forward compatibility, subcarriers may be further reserved on at least one PRB. In an example, a spacing between the reserved subcarriers may be (15×P) kHz (P is a positive integer). Subcarriers may be reserved on each PRB, or subcarriers may be reserved on the target PRB, or subcarriers may be reserved on a PRB other than the target PRB, or subcarriers may be reserved on a PRB on which some subcarriers are used to transmit the DMRS and the other subcarriers are used to transmit the UCI. The reserved subcarriers may be used by the terminal or another terminal to transmit a signal. For example, the reserved subcarriers may be used to transmit the DMRS or the UCI of the terminal or the another terminal. Certainly, some of the reserved subcarriers may be used to transmit the DMRS, and the other reserved subcarriers may be used to transmit the UCI. A PRB on which subcarriers are reserved and a spacing between the reserved subcarriers may be predefined, for example, may be specified in a protocol. Certainly, this may alternatively be configured by the second device for the first device according to an actual situation by using signalling. Optionally, the terminal may increase transmission power of each subcarrier on a PRB on which subcarriers are reserved. As instructed by the base station or specified in a standard, the terminal may increase, through power allocation or in another manner, the transmission power of each subcarrier on the PRB on which the subcarriers are reserved.

In a possible design, a symbol may be repeatedly transmitted P times in time domain in a length of a symbol by using the reserved subcarriers. It is assumed that the subcarrier spacing between the reserved subcarriers is 60 kHz. To transmit a symbol with a 15 kHz subcarrier spacing and a symbol with a 60 kHz subcarrier spacing within same duration in time domain, in duration of the symbol with the 15 kHz subcarrier spacing, the symbol with the 60 kHz subcarrier spacing may be repeatedly transmitted (or replicated) four times, so that a total length of the symbol with the 60 kHz subcarrier spacing is the same as the duration of the symbol with the 15 kHz subcarrier spacing.

The sequence is used to perform spectrum spreading on the DMRS, and the second spreading sequence is used to perform spectrum spreading on the UCI.

According to another aspect, this application provides a computer readable storage medium. The computer readable storage medium stores an instruction, and when the instruction is run on a computer, the computers perform the method according to the foregoing aspect.

According to another aspect, this application provides a computer program product including an instruction. When the computer program product is run on a computer, the computer performs the method according to the foregoing aspect.

According to another aspect, this application provides a chip system, and the chip system includes a processor, configured to support a data sending device in implementing functions in the foregoing aspects, for example, generating or processing data and/or information in the foregoing method. In a possible design, the chip system further includes a memory, and the memory is configured to store a program instruction and data that are necessary for the data sending device. The chip system may include a chip, or may include a chip and another discrete device.

It can be learned that in the solutions provided in this application, the control channel may be transmitted by using the N symbols and the M PRBs (N is not less than 1, and M is not less than 1), and the control channel includes the demodulation reference signal (DMRS) and the uplink control information (UCI). Further, in the solutions provided in this application, the DMRS is transmitted in a length of at least one symbol by using the target PRB, so as to implement control channel transmission in another communications technology.

DETAILED DESCRIPTION OF ILLUSTRATIVE EMBODIMENTS

The embodiments of this application provide a control channel transmission method and related apparatuses (a first device and a second device), to implement control channel transmission in another communications technology.

First, a system operating environment of the first device and the second device is described. The technology described in this application is applicable to communications systems using various radio access technologies, for example, systems using code division multiple access (CDMA), frequency division multiple access (FDMA), time division multiple access (TDMA), orthogonal frequency division multiple access (OFDMA), and single carrier frequency division multiple access (SC-FDMA), and another access technology, and is further applicable to a subsequent evolved system, for example, a 5G system (which may also be referred to as new radio (NR)).

Figure 1:
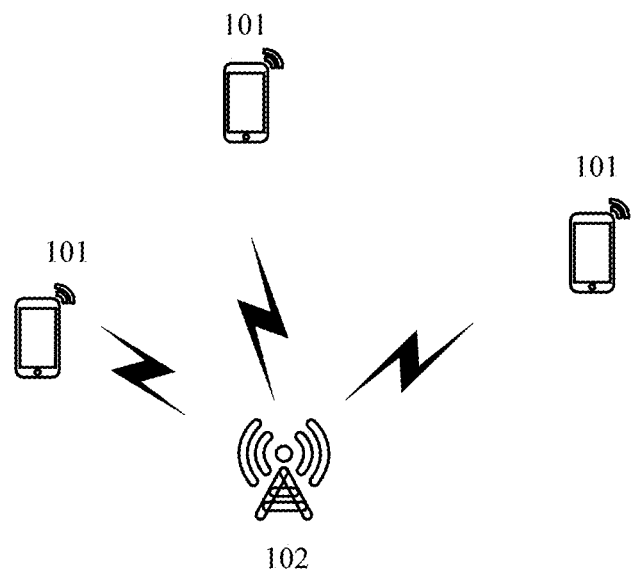
FIG. 1 is a schematic diagram of a communications system according to an embodiment of this application.

FIG. 1 shows an example architecture of a communications system including a first device and a second device. The communications system includes a second device 102 and at least one first device 101 (three first devices 101 are shown in the figure), and the second device 102 communicates with each first device 101 by using a radio signal.

It should be understood that only one second device 102 is shown in the architecture of the communications system shown in FIG. 1. However, this application is not limited thereto. In addition to the second device 102, the communications system may include a second device and a first device that are neighbors of the second device 102 and that transmit a service on a same time-frequency resource, and a coverage area of each second device may further include another quantity of wireless communications devices. Optionally, the communications system including the second device and the first device in FIG. 1 may further include another network entity and the like. This embodiment of this application imposes no limitation.

The communications system used in the embodiments of this application may be a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), another wireless communications system that uses an orthogonal frequency division (OFDM) technology, or the like. The system architecture and a service scenario described in the embodiments of this application are intended to describe the technical solutions in the embodiments of this application more clearly, but are not intended to limit the technical solutions provided in the embodiments of this application. A person of ordinary skill in the art may know that, as a network architecture evolves and a new service scenario emerges, the technical solutions provided in the embodiments of this application are also applicable to a similar technical problem.

Figure 2A:
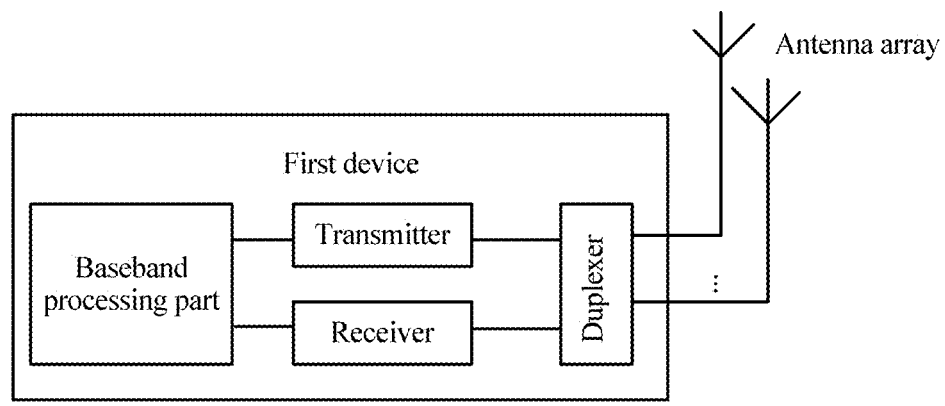
FIG. 2a and FIG. 2b each are a diagram of an example structure of a first device according to an embodiment of this application.
Figure 2B:
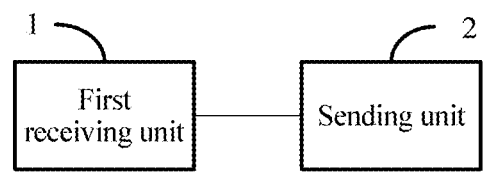
Figure 2C:
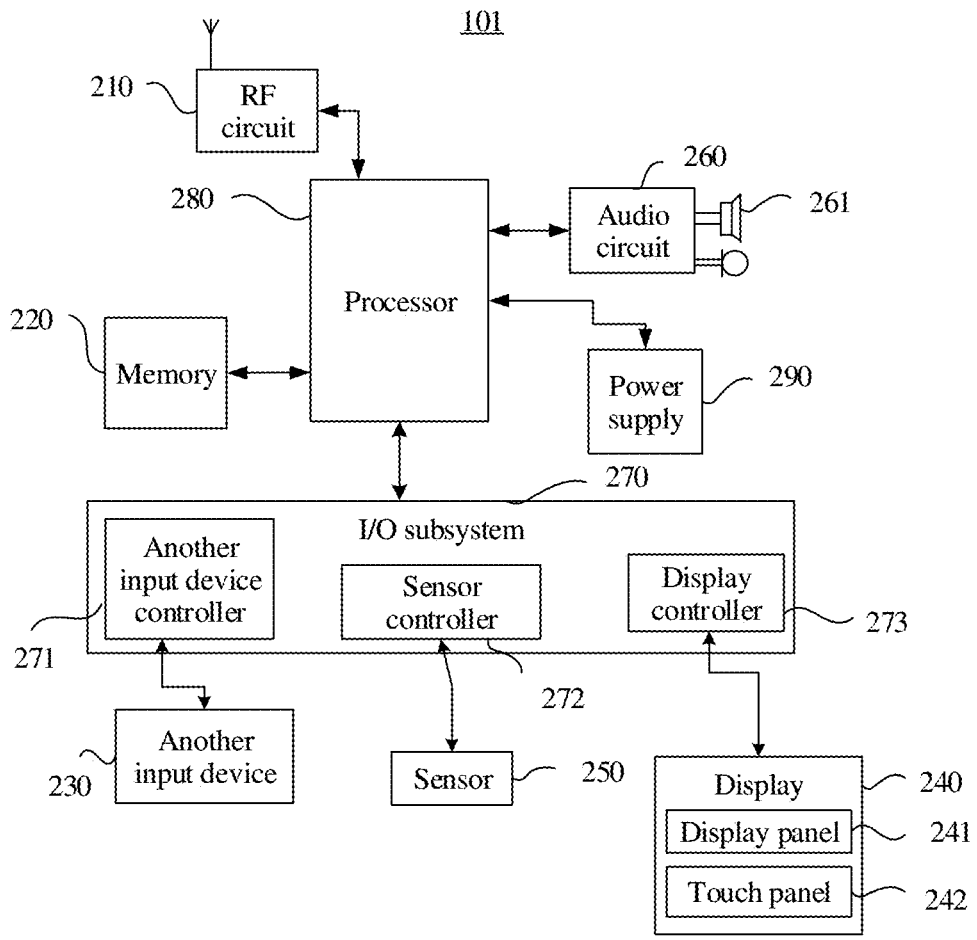
FIG. 2c to FIG. 2e each are a diagram of an example structure of a second device according to an embodiment of this application.

Further, refer to FIG. 2a to FIG. 2c. FIG. 2a shows an example structure of the first device 101 in the communications system shown in FIG. 1. As shown in FIG. 2a, the first device 101 may include an antenna array, a duplexer, a transmitter (TX), a receiver (RX) (the TX and the RX may be collectively referred to as a transceiver (TRX)), and a baseband processing part.

The duplexer is configured to implement the antenna array, and the duplexer may be configured to send a signal and receive a signal. The TX is configured to implement conversion between a radio frequency signal and a baseband signal. The TX may usually include a power amplifier (, PA), a digital-to-analog converter (DAC), and a frequency converter. The RX may include a low noise amplifier (LNA), an analog to digital converter (ADC), a frequency converter, and the like.

The baseband processing part is configured to process a sent signal or a received signal, for example, perform layer mapping, precoding, modulation/demodulation, and coding/decoding, and separately process a physical control channel, a physical data channel, a physical broadcast channel, a reference signal, and the like. Further, the first device may include a control part, configured to perform resource scheduling and allocation, pilot scheduling, user physical layer parameter configuration, and the like.

FIG. 2b shows another example structure of the first device 101. The first device 101 includes a first receiving unit 1 and a sending unit 2. Functions of the units are described below in this specification with reference to a transmission method.

The first device 101 may be specifically a device that provides a user with voice and/or data connectivity, and includes a wired terminal and a wireless terminal. The wireless terminal may be a handheld device with a wireless connection function, another processing device connected to a wireless modem, or a mobile terminal that communicates with one or more core networks through a radio access network. For example, the wireless terminal may be a mobile phone, a handset, a computer, a tablet computer, a personal digital assistant (PDA), a mobile Internet device (MID), a wearable device, or an e-book reader. For another example, the wireless terminal may be a portable, pocket-sized, handheld, computer built-in, or vehicle-mounted mobile device. For still another example, the wireless terminal may be a mobile station or an access point. In addition, user equipment (UE) is a type of terminal, and is a name of the device in an LTE system. For ease of description, in subsequent descriptions of this application, the devices mentioned above are collectively referred to as a terminal.

For example, the first device is a mobile phone. FIG. 2c is a block diagram of a partial structure of a mobile phone 200 related to an embodiment of this application. Referring to FIG. 2c, the mobile phone 200 includes components such as an radio frequency (RF) circuit 210, a memory 220, another input device 230, a display 240, a sensor 250, an audio circuit 260, an input/output (I/O) subsystem 270, a processor 280, and a power supply 290. A person skilled in the art may understand that the mobile phone structure shown in FIG. 2c imposes no limitation on the mobile phone, and the mobile phone 200 may include more or fewer components than those shown in the figure, or combine some components, or split some components, or have different component arrangement. A person skilled in the art may understand that the display 240 belongs to a user interface (UI), and the mobile phone 200 may include more or fewer user interfaces than those shown in the figure.

The components of the mobile phone 200 are specifically described below with reference to FIG. 2c.

The RF circuit 210 may be configured to receive and send a signal during information receiving and sending or during a call, particularly, after receiving downlink information of a base station, send the downlink information to the processor 280 for processing, and in addition, send uplink data of the mobile phone to the base station. The RF circuit usually includes but is not limited to an antenna, at least one amplifier, a transceiver, a coupler, an LNA, and a duplexer. In addition, the RF circuit 210 may communicate with a network and another device through wireless communication. The wireless communication may use any communications standard or protocol, including but not limited to a global system for mobile communications (GSM), a general packet radio service (GPRS), code division multiple access (CDMA), wideband code division multiple access (WCDMA), long term evolution (LTE), email, a short message service (SMS), and a 5G access network technology (NR).

The memory 220 may be configured to store a software program and a module. The processor 280 performs various function applications of the mobile phone 200 and data processing by running the software program and the module that are stored in the memory 220. The memory 220 may mainly include a program storage area and a data storage area. The program storage area may store an operating system, an application program required by at least one function (for example, a sound play function or an image play function), and the like. The data storage area may store data (for example, audio data or a phone book) created based on use of the mobile phone 200, and the like.

In addition, the memory 220 may include a high-speed random access memory, or may include a nonvolatile memory such as at least one magnetic disk storage device, a flash memory, or another volatile solid-state storage device.

The another input device 230 may be configured to receive entered digital or character information, and generate key signal input related to user settings and function control of the mobile phone 200.

Specifically, the another input device 230 may include but is not limited to one or more of a physical keyboard, a function key (such as a volume control key or an on/off key), a trackball, a mouse, a joystick, and an optical mouse (the optical mouse is a touch-sensitive surface that does not display visual output, or an extension of a touch-sensitive surface formed by a touchscreen). The another input device 230 is connected to another input device controller 271 of the I/O subsystem 270, and exchanges a signal with the processor 280 under control of the another input device controller 271.

The display 240 may be configured to display information entered by a user or information provided for a user, and various menus of the mobile phone 200, and may further receive a user input. Specifically, the display 240 may include a display panel 241 and a touch panel 242. The display panel 241 may be configured in a form of a liquid crystal display (LCD), an organic light-emitting diode (OLED), or the like. The touch panel 242 is also referred to as a touchscreen, a touch-sensitive screen, or the like, and may collect a touch or non-touch operation (for example, an operation performed by the user on or near the touch panel 242 by using any proper object or accessory, such as a finger or a stylus, or a motion sensing operation, where the operation includes a single-point control operation or a multipoint control operation) performed by the user on or near the touch panel 242, and drive a corresponding connection apparatus based on a preset program.

Optionally, the touch panel 242 may include two parts: a touch detection apparatus and a touch controller. The touch detection apparatus detects a touch orientation and gesture of the user, detects a signal brought by a touch operation, and transmits the signal to the touch controller. The touch controller receives touch information from the touch detection apparatus, converts the touch information into information that can be processed by the processor, and then sends the information to the processor 280, and can receive and execute a command sent by the processor 280. In addition, the touch panel 242 may be implemented in a plurality of types such as a resistive type, a capacitive type, an infrared ray, and a surface acoustic wave, or the touch panel 242 may be implemented by using any technology developed in the future.

Further, the touch panel 142 may cover the display panel 241. The user may perform, based on content displayed on the display panel 241 (the displayed content includes but is not limited to a soft keyboard, a virtual mouse, a virtual key, an icon, and the like), an operation on or near the touch panel 242 that covers the display panel 241. After detecting the operation on or near the touch panel 242, the touch panel 242 transmits the operation to the processor 280 by using the I/O subsystem 270, to determine a user input. Then the processor 280 provides corresponding visual output on the display panel 241 based on the user input by using the I/O subsystem 270. In FIG. 2c, the touch panel 242 and the display panel 241 serve as two independent components to implement input and output functions of the mobile phone 200. However, in some embodiments, the touch panel 242 and the display panel 241 may be integrated to implement the input and output functions of the mobile phone 200.

The mobile phone 200 may further include at least one sensor 250, for example, an optical sensor, a motion sensor, and another sensor. Specifically, the optical sensor may include an ambient light sensor and a proximity sensor. The ambient light sensor may adjust luminance of the display panel 241 based on brightness of ambient light. The proximity sensor may power off the display panel 241 and/or backlight when the mobile phone 200 moves to an ear. As one type of motion sensor, an accelerometer sensor may detect a value of an acceleration in each direction (usually three axes), may detect a value and a direction of gravity when the sensor is stationary, and may be used in an application that identifies a mobile phone posture (for example, screen switching between a landscape mode and a portrait mode, a related game, and magnetometer posture calibration), a function related to vibration identification (such as a pedometer or a knock), and the like. Other sensors such as a gyroscope, a barometer, a hygrometer, a thermometer, and an infrared sensor can be further disposed on the mobile phone 200, and details are not described herein.

The audio circuit 260, a speaker 261, and a microphone 262 may provide an audio interface between the user and the mobile phone 200. The audio circuit 260 may convert received audio data into a signal and transmit the signal to the speaker 261, and the speaker 261 converts the signal into a sound signal and outputs the sound signal. In addition, the microphone 262 converts a collected sound signal into a signal, and the audio circuit 260 receives the signal, converts the signal into audio data, and outputs the audio data to the RF circuit 210 to send the audio data to, for example, another mobile phone, or outputs the audio data to the memory 220 for further processing.

The I/O subsystem 270 is configured to control an external input/output device, and may include the another input device controller 271, a sensor controller 272, and a display controller 273.

Optionally, one or more other input device controllers 271 receive a signal from the another input device 230 and/or send a signal to the another input device 230.

The another input device 230 may include a physical button (such as a push-button or a rocker button), a dial pad, a slider switch, a joystick, a click scroll wheel, and an optical mouse (the optical mouse is a touch-sensitive surface that does not display visual output, or an extension of a touch-sensitive surface formed by a touchscreen).

It should be noted that the another input device controller 271 may be connected to any one or more of the foregoing devices.

The display controller 273 in the I/O subsystem 270 receives a signal from the display 240 and/or sends a signal to the display 240. After the display 240 detects a user input, the display controller 273 converts the detected user input into interaction with a user interface object displayed on the display 240, to implement human-machine interaction. The sensor controller 272 may receive a signal from one or more sensors 250 or send a signal to one or more sensors 250.

The processor 280 is a control center of the mobile phone 200 and is connected to all parts of the entire mobile phone through various interfaces and lines, and performs various functions of the mobile phone 200 and data processing by running or executing the software program and/or the module stored in the memory 220 and invoking data stored in the memory 220, to perform overall monitoring on the mobile phone. Optionally, the processor 280 may include one or more processing units. Preferably, an application processor and a modem processor may be integrated into the processor 280. The application processor mainly processes an operating system, a user interface, an application program, and the like. The modem processor mainly processes wireless communication. It can be understood that the modem processor may not be integrated into the processor 280.

The mobile phone 200 further includes the power supply 290 (for example, a battery) that supplies power to each component. Preferably, the power supply may be logically connected to the processor 280 by using a power management system, to implement functions such as charging management, discharging management, and power consumption management by using the power management system.

Although not shown, the mobile phone 200 may further include a camera, a Bluetooth module, and the like. Details are not described herein.

The processor 280 executes the program stored in the memory 220 and invokes another device, so as to implement actions completed by the first device 101 in a control channel transmission method provided in the following embodiments shown in FIG. 3 to FIG. 11.

Figure 2D:
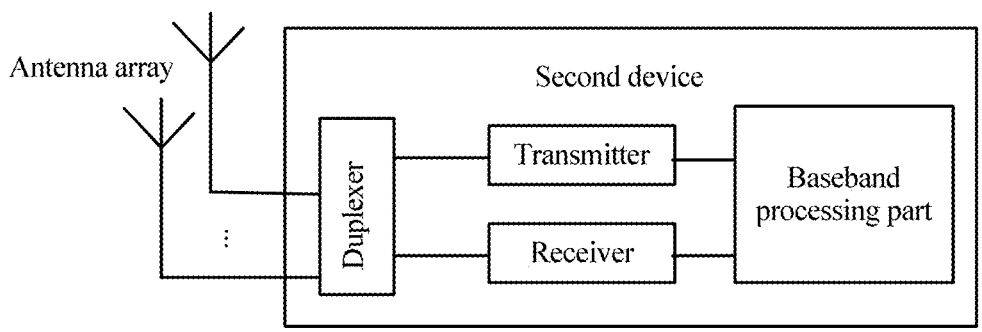

FIG. 2d shows an example structure of the second device 102 in the communications system shown in FIG. 1. The second device 102 may include an antenna, a duplexer, a TX, an RX (the TX and the RX may be collectively referred to as a transceiver (TRX)), and a baseband processing part.

As shown in FIG. 2d, the second device includes a plurality of antennas (that is, an antenna array). It should be understood that the second device may include a single antenna.

The duplexer enables the antenna array to send a signal and receive a signal. The TX is configured to implement conversion between a radio frequency signal and a baseband signal. The TX may usually include a PA, a DAC, and a frequency converter. The RX may include an LNA, an ADC, and a frequency converter.

The baseband processing part is configured to process a sent signal or a received signal, for example, perform layer mapping, precoding, modulation/demodulation, and coding/decoding, and separately process a physical control channel, a physical data channel, a physical broadcast channel, a reference signal, and the like. Further, the first device may include a control part, configured to request an uplink physical resource, determine whether a downlink data packet is successfully received, and so on.

The control part works in cooperation with another device, so as to implement a transmission method provided in the following embodiments shown in FIG. 3 to FIG. 11.

Figure 2E:
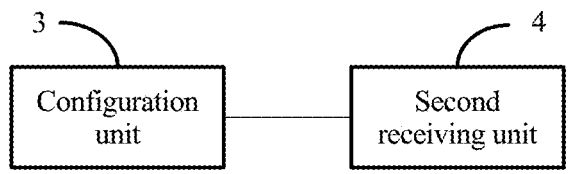

FIG. 2e shows another example structure of the second device 102. The second device 102 includes a configuration unit 3 and a second receiving unit 4. Functions of the units are described below in this specification with reference to a transmission method.

The second device may be a base station, or another device that can send a control channel. The base station in this application is an apparatus that is deployed in a radio access network (RAN) and that is configured to provide the first device with a wireless communication function. The base station may include a macro base station, a micro base station, a relay station, an access point base station controller, a transmission/reception point (TRP), and the like in various forms. Specific names of the base station may be different in systems that use different radio access technologies. For example, in an LTE network, the base station is referred to as an evolved NodeB (eNB or e-NodeB), and in a subsequent evolved system, the base station may be referred to as a new radio NodeB (gNB).

An example in which the second device is a base station and the first device is a mobile terminal is used below to describe a control channel transmission solution.

Figure 3:
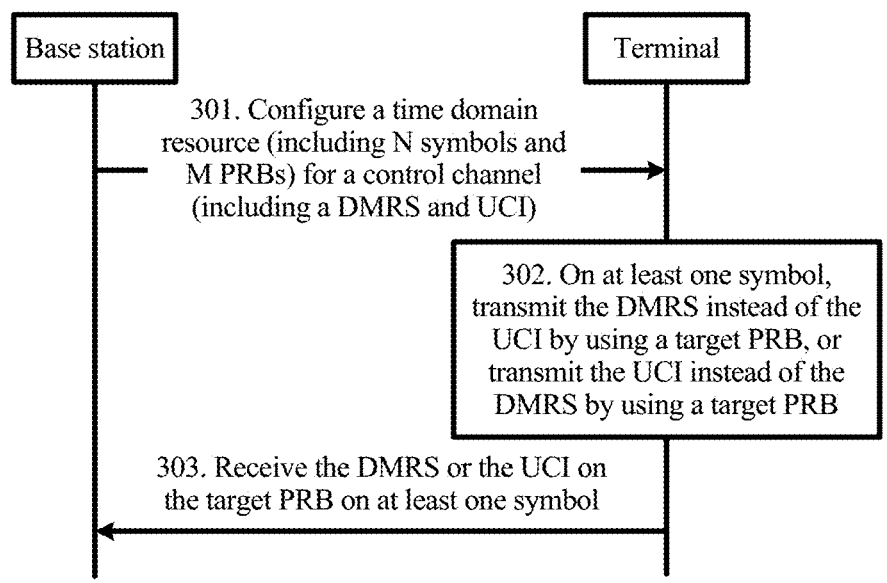
FIG. 3 is an example flowchart of a control channel transmission method according to an embodiment of this application.

FIG. 3 shows an example interaction procedure of a transmission method. The interaction procedure may be applied to the communications system mentioned in FIG. 1 (for example, may be applied to a 5G NR scenario), or may be applied to a scenario in which a plurality of communications technologies coexist (for example, 5G NR and LTE coexist).

The interaction procedure includes at least the following steps.

S301. A base station generates and sends configuration information.

The configuration information may be used to indicate a time-frequency resource configured for a control channel.

The time-frequency resource may include N symbols and M physical resource blocks (PRB). For example, N is not less than 1 and not greater than 12, and M is not less than 1.

5G NR is used as an example. The control channel may be specifically an uplink control channel, and occupies one or two symbols in time domain. Because a quantity of symbols occupied in time domain is less than a quantity of symbols occupied in LTE (an uplink control channel in LTE occupies 13 or 14 symbols in time domain), the control channel in 5G NR may also be referred to as a short-duration uplink control channel (signalling), and the uplink control channel (signalling) in LTE is referred to as a long-duration uplink control channel (signalling).

It should be noted that in the 5G NR system, N may be equal to 1 or 2. Certainly, in addition to being equal to 1 or 2, a value of N may be flexibly designed according to different scenarios. Details are not described herein.

Specifically, step 301 may be performed by the configuration unit 3.

S302. After receiving the configuration information, a terminal sends the control channel on the time-frequency resource.

An uplink control channel is used as an example. The uplink control channel may include a reference signal (DMRS) and uplink control information (UCI). The DMRS may be used for an auxiliary function such as channel quality measurement. On a receiving side, after receiving the DMRS, the base station may calculate a channel estimation result based on the DMRS, and decode the UCI based on the channel estimation result.

In an example, the DMRS may be transmitted on one or more of the N symbols by using a target PRB, or conversely, the UCI may be transmitted on one or more of the N symbols by using a target PRB. The target PRB includes at least one of the M PRBs.

The uplink control channel is used as an example. It is mentioned above that the uplink control channel may occupy a single symbol or two symbols in time domain. Therefore, in a scenario of a single symbol, the DMRS (or conversely, the UCI) may be transmitted in a length of the single symbol by using the target PRB.

For example, it is assumed that a time domain resource allocated to the terminal includes one symbol, a frequency domain resource allocated to the terminal includes a PRB 1 and a PRB 2, and the PRB 1 is the target PRB. In this case, the DMRS may be transmitted in a length of the single symbol by using the PRB 1.

However, in a scenario of two symbols (including a first symbol and a second symbol), it may be designed as follows. The DMRS, or conversely, the UCI may be transmitted on the first symbol, or the second symbol, or all the symbols by using the target PRB. Details are not described herein.

For example, it is assumed that a time domain resource allocated to the terminal includes a first symbol and a second symbol, and a frequency domain resource allocated to the terminal includes a PRB 1 and a PRB 2. In this case, the terminal may transmit the DMRS on the first symbol by using the PRB 1 as the target PRB. However, whether the UCI is transmitted on the second symbol by using the target PRB (for example, the PRB 1) may be flexibly designed.

A distribution structure of the DMRS and the UCI on the time-frequency resource may be predefined. For example, the distribution structure of the DMRS and the UCI on the time-frequency resource may be specified in a protocol. Certainly, the base station may configure the distribution structure of the DMRS and the UCI on the time-frequency resource for the terminal according to an actual situation by using signalling.

It should be noted that in a scenario in which a plurality of communications technologies coexist, for example, 5G NR and LTE coexist, long-duration uplink control signalling is transmitted in LTE by using a spreading sequence (Zad-off Chu sequence). However, a time domain location occupied by the long-duration uplink control signalling may be used by a neighboring cell to transmit short-duration uplink control signalling in 5G NR. Consequently, mutual interference may exist.

To mitigate interference, the base station may indicate a first spreading sequence and a second spreading sequence (the first spreading sequence and the second spreading sequence may be the same or different) to the terminal.

The terminal may perform spectrum spreading on the DMRS by using the first spreading sequence, and perform spectrum spreading on the UCI by using the second spreading sequence. In addition, the first spreading sequence and the second spreading sequence each are orthogonal to a spreading sequence used by the neighboring cell. In this way, a signal on the short-duration uplink control signalling is not interfered with by the uplink control signalling in LTE.

In all embodiments of this application, the first spreading sequence and the second spreading sequence may be used to perform spectrum spreading on used to transmit the DMRS and the UCI, respectively. Details are not described below.

Specifically, the first receiving unit 1 may receive the configuration information, and the sending unit 2 may send the control channel on the time-frequency resource.

S303. The base station receives the control channel on the time-frequency resource.

The base station may receive the control channel based on the distribution structure of the DMRS and the UCI on the time-frequency resource.

Specifically, step 303 may be performed by the second receiving unit 4.

It can be learned that in the solution provided in this application, the control channel may be transmitted by using the N symbols and the M PRBs (neither N nor M is less than 1), and the control channel includes the DMRS and the UCI. Further, in the solution provided in this application, the DMRS is transmitted in a length of at least one symbol by using the target PRB, so as to implement control channel transmission in another communications technology.

An example in which the second device is a base station, the first device is a terminal, and the control channel occupies a single symbol (the first symbol) in time domain is used below to describe in detail how to transmit the control channel on the time-frequency resource.

First, several simple distribution structures of the control channel on the time-frequency resource are described. In all these distribution structures, the terminal transmits the UCI by using an RPB contiguous to the target PRB. Therefore, the DMRS and the UCI are distributed alternately on PRBs.

The DMRS and the UCI are distributed alternately on the PRBs, so that all PRBs around a PRB used to transmit the DMRS may be decoded with reference to a channel estimation result of the DMRS on the PRB, and a quantity of PRBs used to transmit the UCI may be maximized.

First Distribution Structure:

The terminal, or the sending unit 2 of the terminal, transmits the DMRS on a PRB whose sequence number (index number/identifier) is an odd number. Correspondingly, (the second receiving unit 4 of) the base station receives the DMRS on the PRB whose sequence number (index number/identifier) is an odd number. For example, referring to FIG. 4a, it is assumed that a PRB 1 to a PRB 4 are configured for the terminal. The terminal may transmit the DMRS by using the PRB 1 and the PRB 3, and transmit the UCI by using the PRB 2 and the PRB 4. The base station receives the DMRS on the PRB 1 and the PRB 3, and receives the UCI on the PRB 2 and the PRB 4.

In this distribution structure, the DMRS and the UCI each occupy all 12 subcarriers of an entire PRB for transmission. If M is an even number, a ratio of a quantity of PRBs used to transmit the DMRS to a quantity of PRBs used to transmit the UCI is 1:1.

Second Distribution Structure:

The terminal, or the sending unit 2 of the terminal, transmits the DMRS on a PRB whose sequence number (index number/identifier) is an even number. Correspondingly, (the second receiving unit 4 of) the base station receives the DMRS on the PRB whose sequence number (index number/identifier) is an even number. For example, referring to FIG. 4b, it is assumed that a PRB 1 to a PRB 4 are configured for the terminal. The terminal may transmit the UCI by using the PRB 1 and the PRB 3, and transmit the DMRS by using the PRB 2 and the PRB 4. The base station receives the UCI on the PRB 1 and the PRB 3, and receives the DMRS on the PRB 2 and the PRB 4.

In this distribution structure, the DMRS and the UCI each occupy all 12 subcarriers of an entire PRB for transmission. If M is an odd number, a ratio of a quantity of PRBs used to transmit the DMRS to a quantity of PRBs used to transmit the UCI may be 1:2.

Figure 4A:
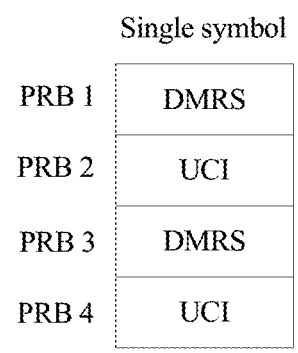
FIG. 4a to FIG. 10b each are an example diagram of a control channel distribution structure according to an embodiment of this application.
Figure 4B:
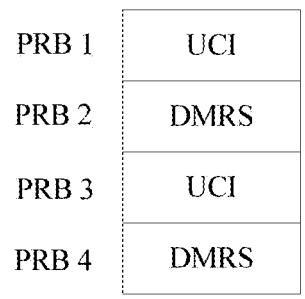
Figure 4C:
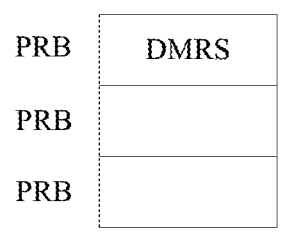
Figure 4D:
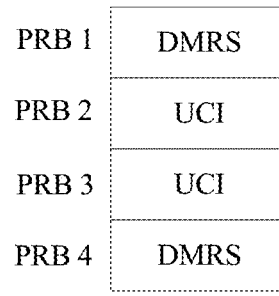
Figure 4E:
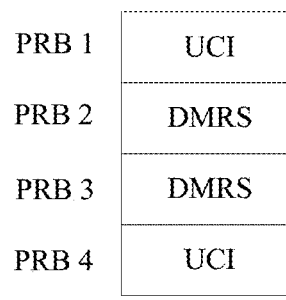

In addition, The terminal, or the sending unit 2 of the terminal, may transmit the DMRS by using the first PRB in the M PRBs (a third distribution structure), or transmit the DMRS by using the first PRB and the last PRB in the M PRBs (a fourth distribution structure), or transmit the DMRS by using a PRB other than the first PRB and the last PRB (a fifth distribution structure). In the third to the fifth distribution structures, the DMRS and the UCI each occupy all 12 subcarriers of an entire PRB for transmission. In this case, (the second receiving unit 4 of) the base station receives the DMRS or the UCI on a corresponding PRB based on a specific distribution structure. FIG. 4c to FIG. 4e are example schematic diagrams of the third to the fifth distribution structures. However, a person skilled in the art may flexibly design a distribution structure on this basis.

Second, relatively complex distribution structures of the control channel on the time-frequency resource are described. In all these distribution structures, the M PRBs are divided into at least one PRB group, and PRB groups may be contiguous or non-contiguous in frequency domain. Each PRB group may include the target PRB.

Sixth Distribution Structure:

The terminal, or the sending unit 2 of the terminal, transmits the DMRS on a PRB whose sequence number (index number/identifier) is an odd number in the PRB group, and may transmit the UCI on a PRB whose sequence number (index number/identifier) is an even number in the PRB group. (An action of the base station is receiving the control channel based on a specific distribution structure. Therefore, for brevity, the action of the base station is not repeatedly described below in this specification) If M is an even number, a ratio of a quantity of PRBs used to transmit the DMRS to a quantity of PRBs used to transmit the UCI is 1:1.

To achieve a diversity gain, the DMRS signal may be transmitted on two or more PRB groups that are non-contiguous in frequency domain.

Figure 5A:
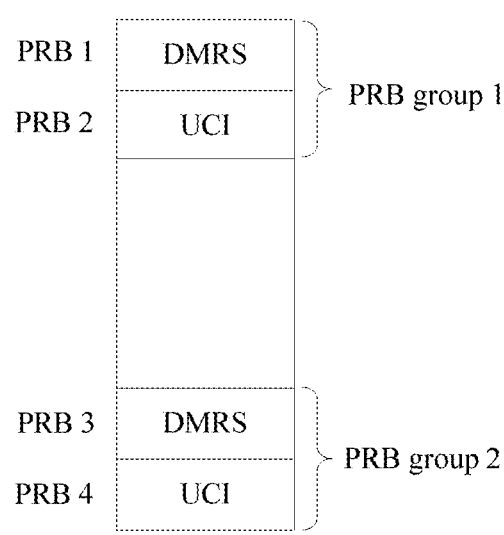

For example, referring to FIG. 5a, it is assumed that a PRB 1 to a PRB 4 are configured for the terminal, the PRB 1 and the PRB 2 belong to a first PRB group (a PRB group 1), the PRB 3 and the PRB 4 belong to a second PRB group (a PRB group 2), and the two PRB groups are non-contiguous. In this case, the DMRS may be transmitted by using the PRB 1 in the first PRB group and the PRB 3 in the second PRB group, and the UCI may be transmitted by using the PRB 2 in the first PRB group and the PRB 4 in the second PRB group. In this distribution structure, the DMRS and the UCI each occupy all 12 subcarriers of an entire PRB for transmission.

Seventh Distribution Structure:

The terminal, or the sending unit 2 of the terminal, transmits the DMRS on a PRB whose sequence number (index number/identifier) is an even number in the PRB group, and may transmit the UCI on a PRB whose sequence number (index number/identifier) is an odd number in the PRB group. The PRB groups may be contiguous or non-contiguous in frequency domain. In this distribution structure, the DMRS and the UCI each occupy all 12 subcarriers of an entire PRB for transmission.

Figure 5B:
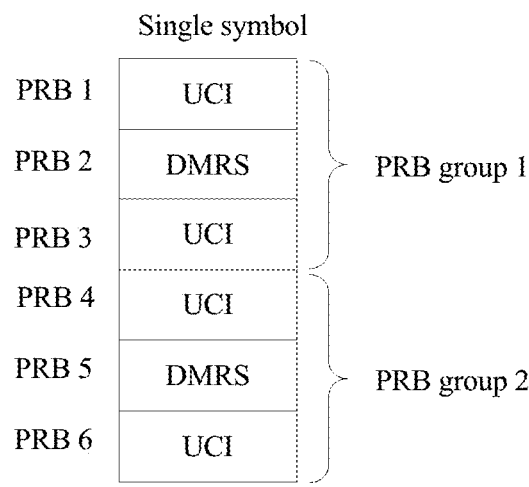

For example, referring to FIG. 5b, it is assumed that a PRB 1 to a PRB 6 are configured for the terminal. The PRB 1 to the PRB 3 belong to a first PRB group (a PRB group 1), and the PRB 4 to the PRB 6 belong to a second PRB group (a PRB group 2). The UCI may be transmitted by using the PRB 2 in the first PRB group and the PRB 5 in the second PRB group, and the DMRS may be transmitted by using the PRB 2 and the PRB 4.

Figure 5C:
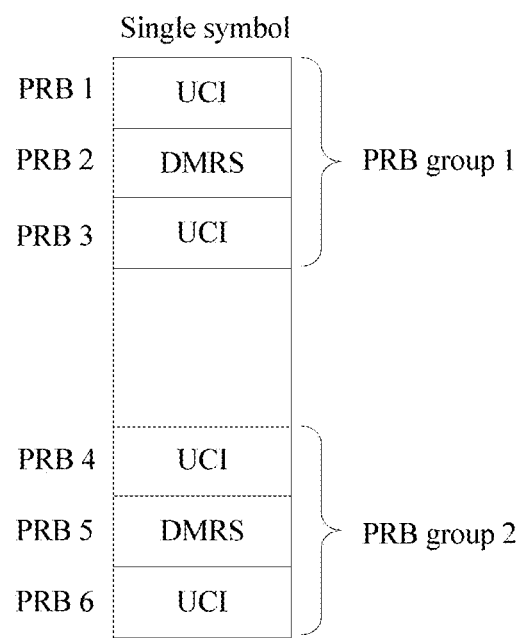

For another example, referring to FIG. 5c, two PRB groups are non-contiguous. The terminal transmits the DMRS signal on one or more PRB frequency domain resources on the first symbol. In FIG. 5b and FIG. 5c, the DMRS is transmitted on a middle PRB in each PRB group, and the UCI signal is transmitted on two PRBs contiguous to the middle PRB. In this case, a ratio of a quantity of PRBs used to transmit the DMRS to a quantity of PRBs used to transmit the UCI is 1:2.

Figure 5D:
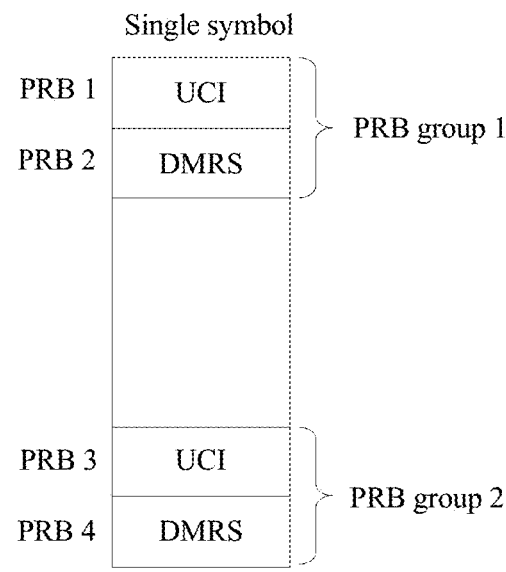
Figure 5E:
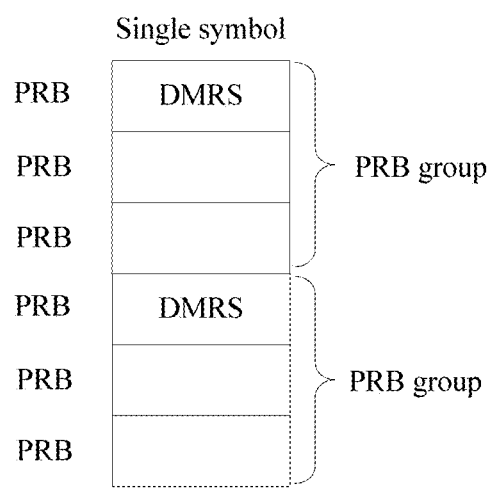
Figure 5F:
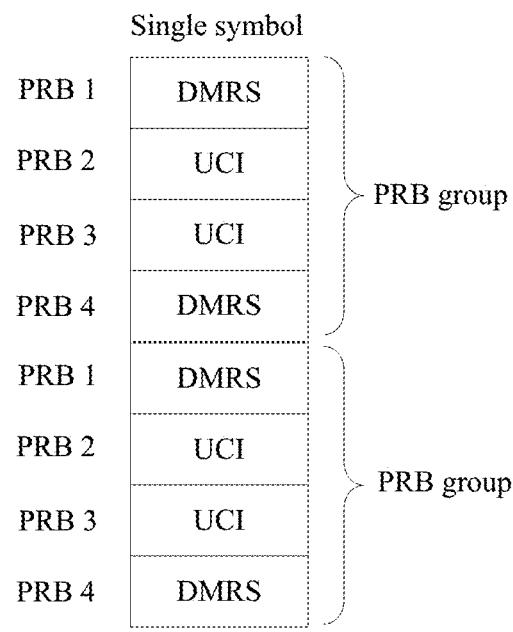
Figure 5G:
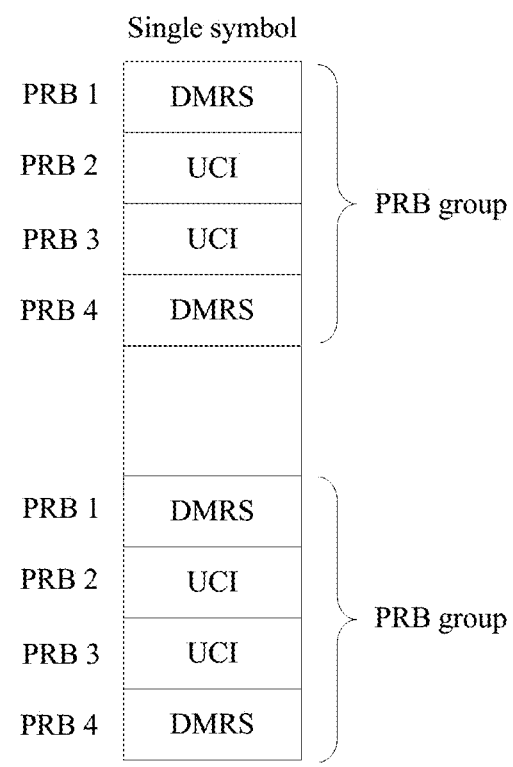
Figure 5H:
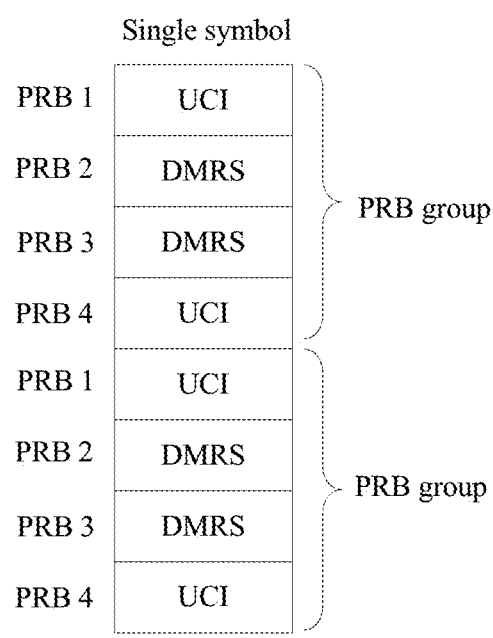
Figure 5I:
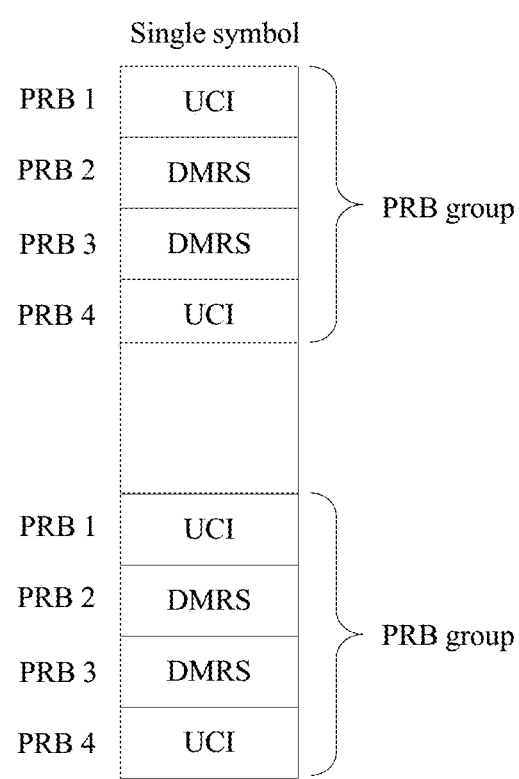

In addition, referring to FIG. 5d, the PRB group may include an even quantity of PRBs. Details are not described herein.

In addition, the DMRS may be transmitted by using the first PRB in the PRB group (an eighth distribution structure), or the DMRS is transmitted by using the first PRB and the last PRB in the PRB group (a ninth distribution structure), or the DMRS is transmitted by using a PRB other than the first PRB and the last PRB in the PRB group (a tenth distribution structure). In the eighth to the tenth distribution structures, the DMRS and the UCI each occupy all 12 subcarriers of an entire PRB for transmission. FIG. 5e to FIG. 5i are example schematic diagrams of the eighth to the tenth distribution structures. However, a person skilled in the art may flexibly design a distribution structure on this basis.

Third, more complex distribution structures of the control channel on the time-frequency resource are described. In all these distribution structures, in a length of a symbol, the UCI is transmitted by using some subcarriers of another PRB (other than the target PRB), and the DMRS is transmitted by using the other subcarriers. The another PRB includes at least one of the M PRBs, and the "another PRB" does not include the target PRB. Simple descriptions are provided below.

Eleventh Distribution Structure:

The terminal, or the sending unit 2 of the terminal, transmits the DMRS on the first PRB, transmits the UCI on some subcarriers of another PRB, and transmits the DMRS on the other subcarriers.

Figure 6A:
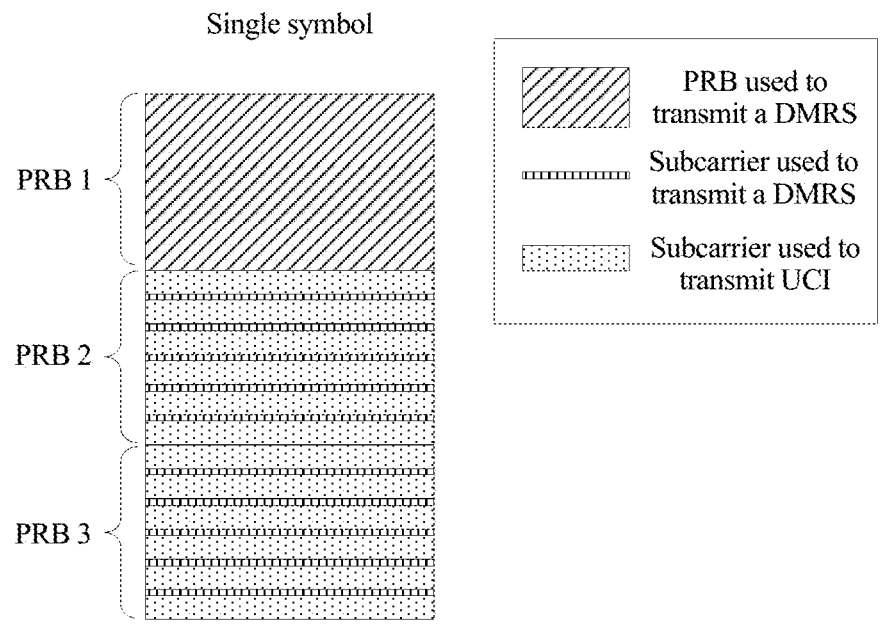

For example, referring to FIG. 6a, it is assumed that a PRB 1 to a PRB 3 are configured for the terminal. In this case, the PRB 1 may be used to transmit the DMRS, some subcarriers of the PRB 2 and the PRB 3 may be used to transmit the DMRS, and the other subcarriers may be used to transmit the UCI. The DMRS and the UCI coexist in a frequency division multiplexing (FDM) manner.

Specifically, the subcarriers used to transmit the DMRS and the subcarriers used to transmit the UCI may be predefined, for example, may be specified in a protocol. Certainly, the base station may configure this for the terminal according to an actual situation by using signalling.

Twelfth Distribution Structure:

The terminal, or the sending unit 2 of the terminal, transmits the DMRS on the first PRB and the last PRB, transmits the UCI on some subcarriers of another PRB, and transmits the DMRS on the other subcarriers.

Figure 6B:
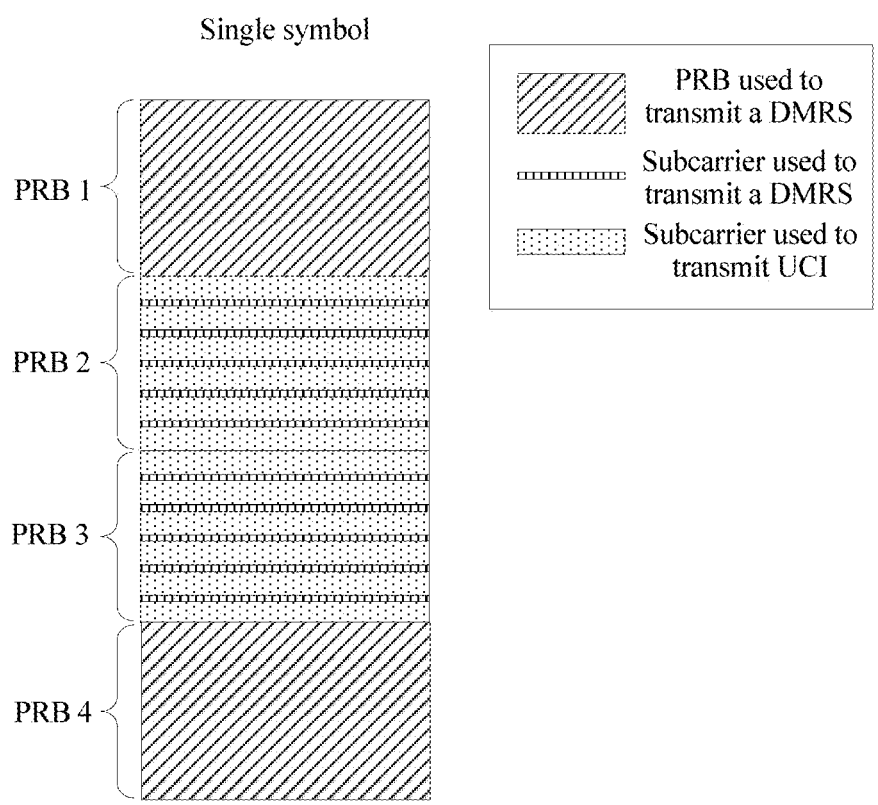

For example, referring to FIG. 6b, it is assumed that a PRB 1 to a PRB 4 are configured for the terminal. In this case, the PRB 1 and the PRB 4 may be used to transmit the DMRS, some subcarriers of the PRB 2 and the PRB 3 may be used to transmit the DMRS, and the other subcarriers may be used to transmit the UCI. The DMRS and the UCI coexist in an FDM manner.

Thirteenth Distribution Structure:

The terminal, or the sending unit 2 of the terminal, transmits the DMRS on a PRB other than the first PRB and the last PRB, transmits the UCI on some subcarriers of another PRB, and transmits the DMRS on the other subcarriers.

Figure 6C:
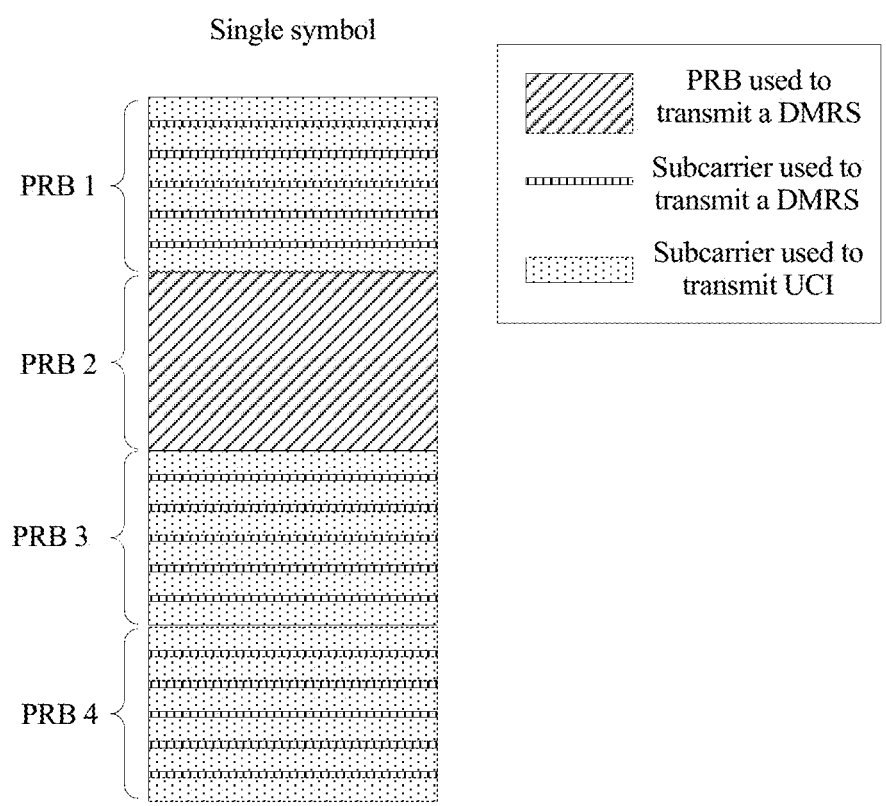

For example, referring to FIG. 6c, it is assumed that a PRB 1 to a PRB 4 are configured for the terminal. In this case, the PRB 2 may be used to transmit the DMRS, some subcarriers of the other PRBs may be used to transmit the DMRS, and the other subcarriers may be used to transmit the UCI. The DMRS and the UCI coexist in an FDM manner. Certainly, the PRB 2 and the PRB 3 may be used to transmit the DMRS, some subcarriers of the other PRBs may be used to transmit the DMRS, and the other subcarriers may be used to transmit the UCI.

Fourteenth Distribution Structure:

The M PRBs are divided into at least one PRB group, and PRB groups may be contiguous or non-contiguous in frequency domain. Each PRB group may include the target PRB.

Figure 6D:
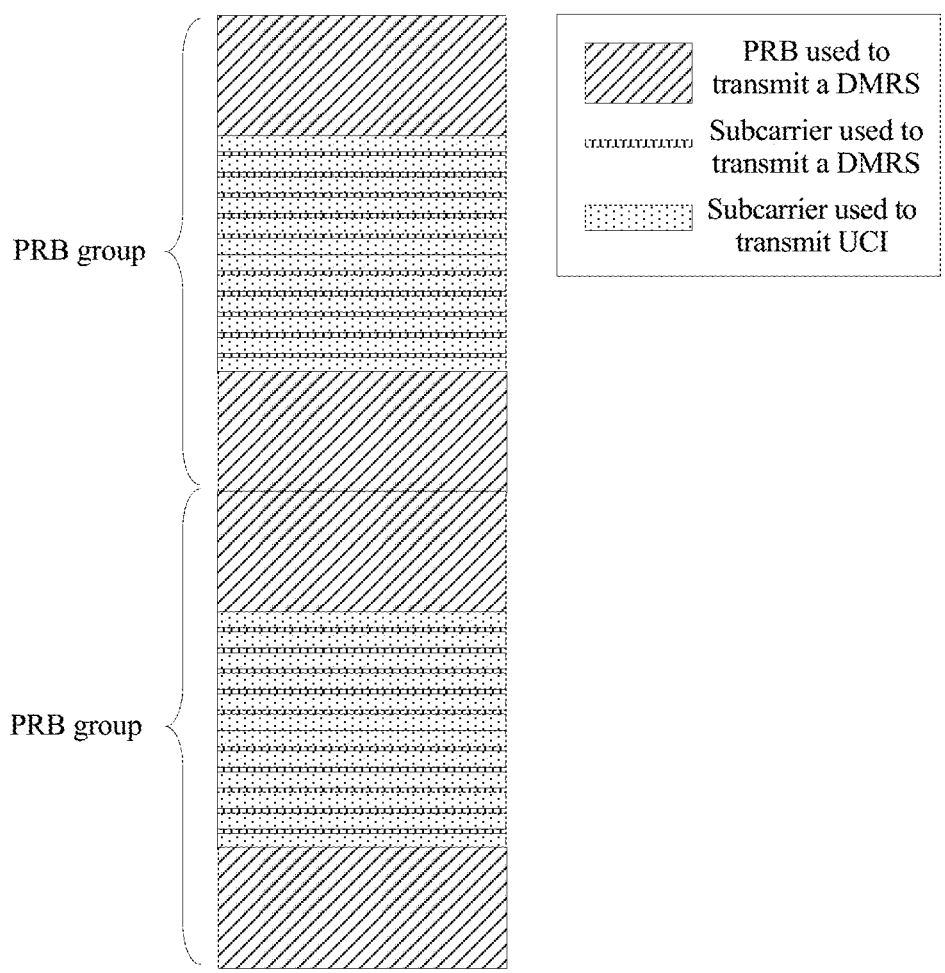

In each PRB group, for the distribution structure of the DMRS and the UCI on the time-frequency resource, refer to the eleventh to the thirteenth distribution structures. For example, FIG. 6d is a schematic diagram of the twelfth distribution structure used by the PRB group.

After a distribution structure in which the control channel occupies a single symbol in time domain is described, a distribution structure in which the control channel occupies a plurality of symbols in time domain and occupies M PRBs in frequency domain is described below. For brevity, two symbols are used as an example for description.

The two symbols occupied by the control channel in time domain may include a first symbol and a second symbol.

Any one of the first to the fourteenth distribution structures may be selected as a distribution structure of the DMRS and the UCI on the first symbol.

In an example, a distribution structure of the DMRS and the UCI on the second symbol may be obtained by directly replicating the distribution structure of the DMRS and the UCI on the first symbol. In other words, distribution structures of the DMRS and the UCI on the two symbols are the same.

Figure 7A:
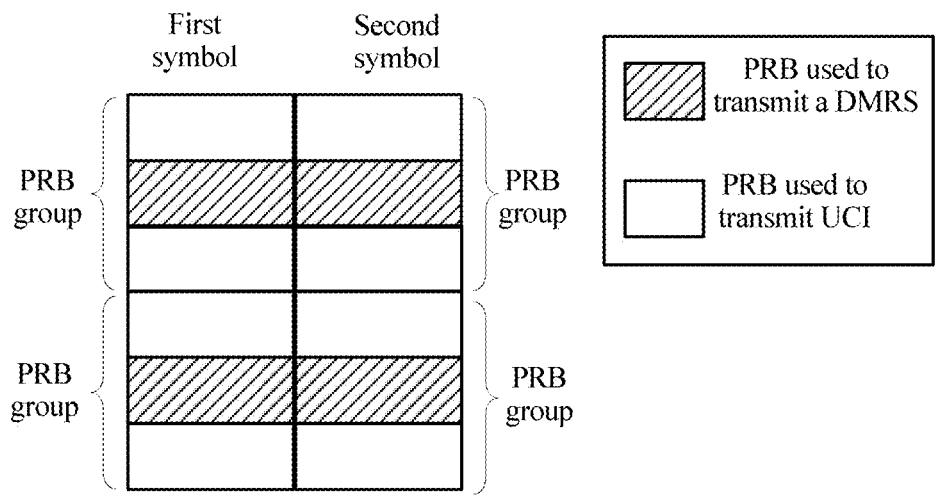
Figure 7B:
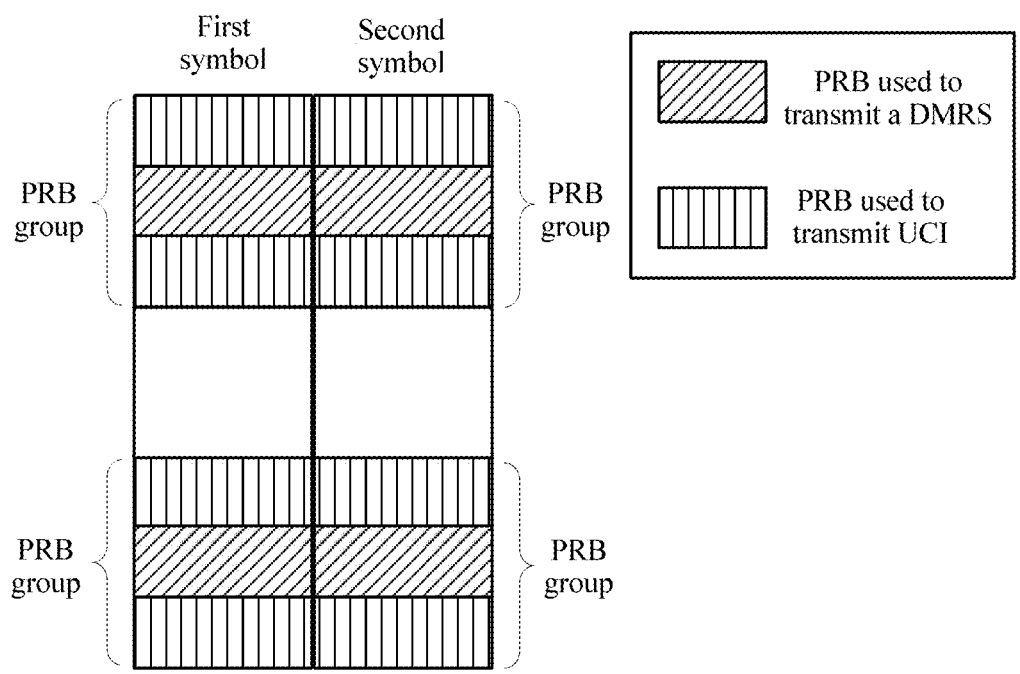
Figure 7C:
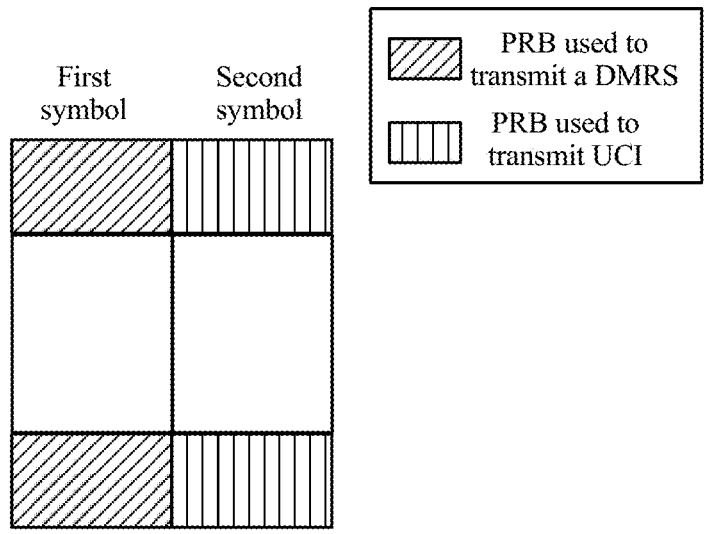
Figure 7D:
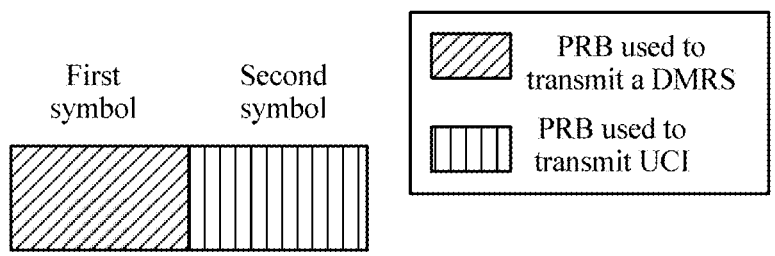
Figure 7E:
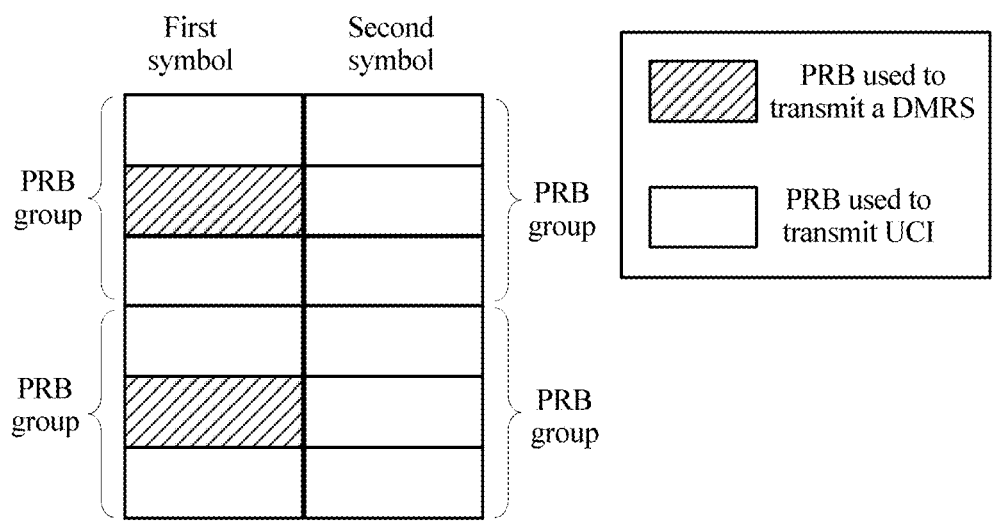
Figure 7F:
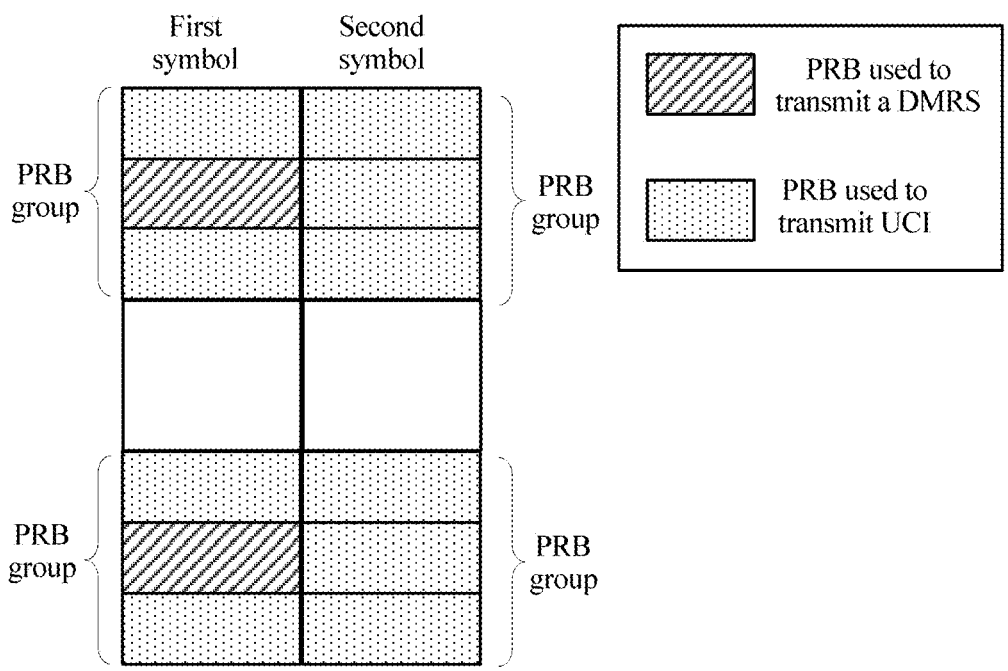
Figure 7G:
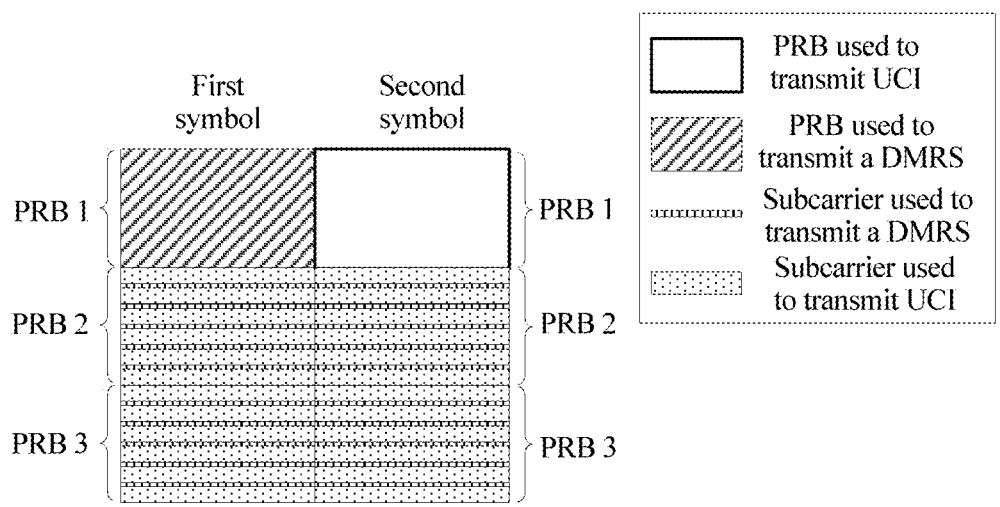
Figure 7H:
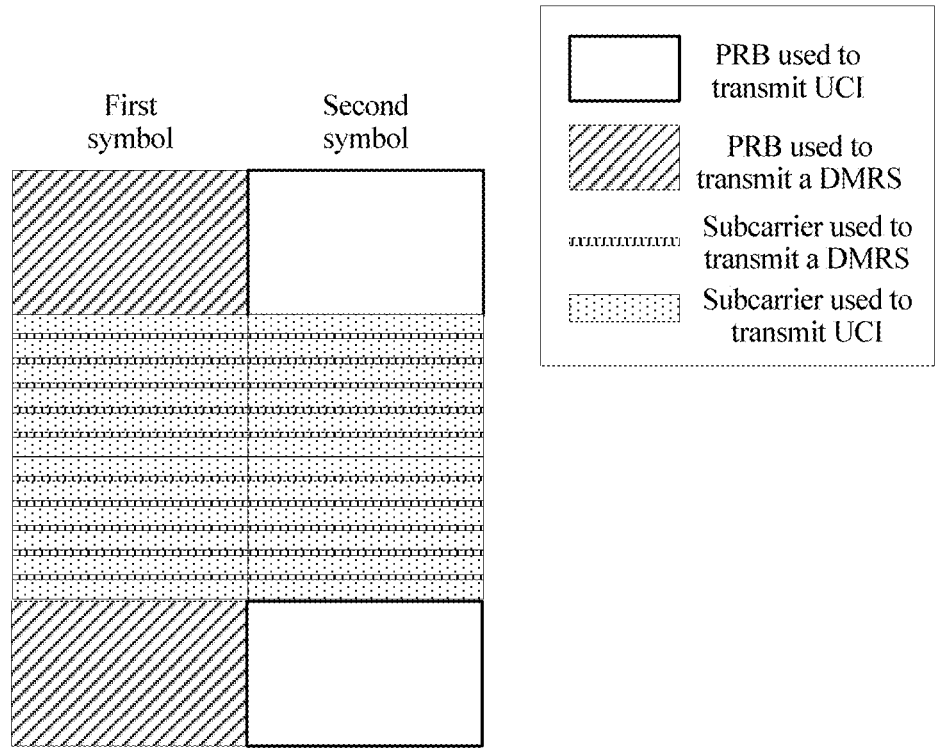
Figure 7I:
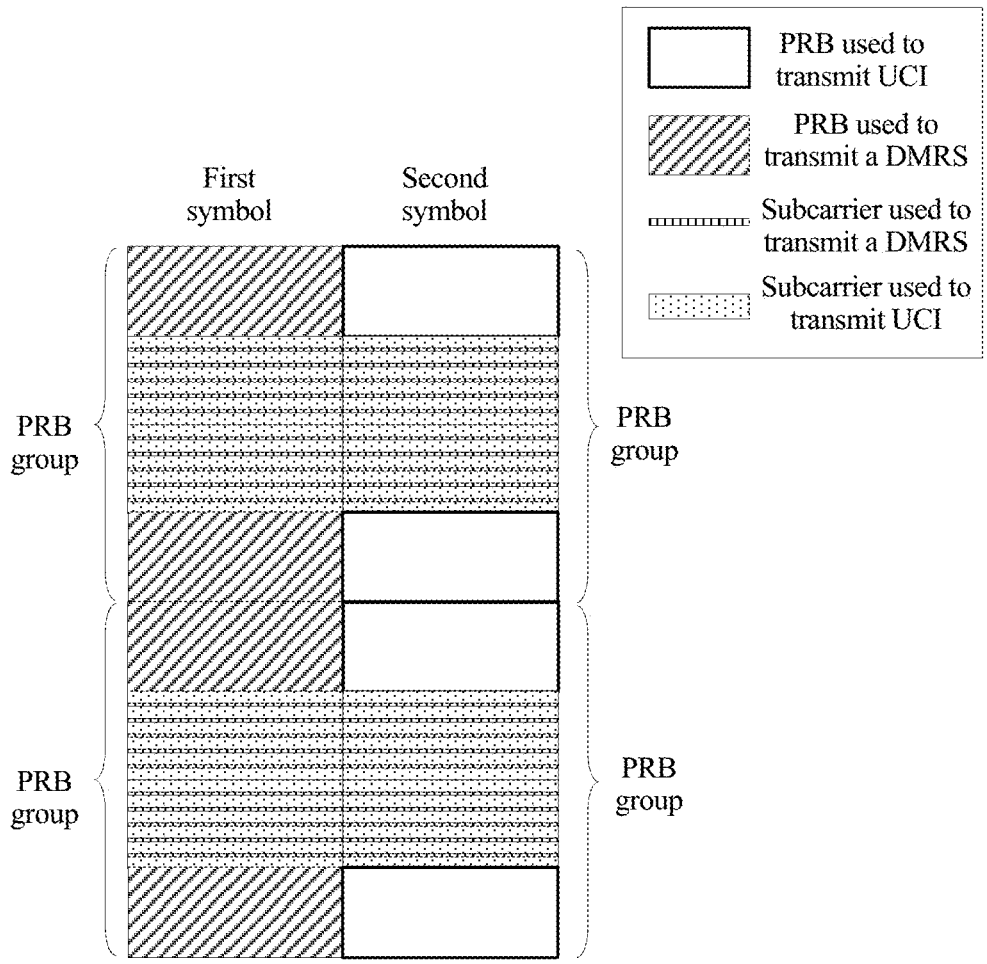

For example, referring to FIG. 7a and FIG. 7b, in a length of the first symbol, the terminal, or the sending unit 2 of the terminal, transmits the DMRS on a PRB whose sequence number (index number/identifier) is an even number in a PRB group, and transmits the UCI on a PRB whose sequence number (index number/identifier) is an odd number. In a length of the second symbol, the terminal or the sending unit 2 of the terminal, also transmits the DMRS on a PRB whose sequence number (index number/identifier) is an even number in the PRB group, and transmits the UCI on a PRB whose sequence number (index number/identifier) is an odd number. The DMRS and the UCI each occupy all 12 subcarriers of an entire PRB for transmission. If M is an odd number, a ratio of a quantity of PRBs used to transmit the DMRS to a quantity of PRBs used to transmit the UCI may be 1:2.

In another example, a distribution structure of the DMRS and the UCI on the second symbol may be any one of the first to the fourteenth distribution structures. In other words, the distribution structure of the DMRS and the UCI on the second symbol is not necessarily the same as the distribution structure of the DMRS and the UCI on the first symbol.

In still another example, a distribution structure of the DMRS and the UCI on the second symbol may be opposite to the distribution structure of the DMRS and the UCI on the first symbol. The "opposite" means that a PRB or a subcarrier used to transmit the DMRS on the first symbol is used to transmit the UCI on the second symbol. For example, referring to FIG. 7c and FIG. 7d, a PRB used to transmit the DMRS on the first symbol is used to transmit the UCI on the second symbol.

In still another example, the UCI may be transmitted in a length of the second symbol by using all PRBs. For example, referring to FIG. 7e and FIG. 7f, in a length of the first symbol, the terminal, or the sending unit 2 of the terminal, transmits the DMRS on a PRB whose sequence number (index number/identifier) is an even number in a PRB group, and transmits the UCI on a PRB whose sequence number (index number/identifier) is an odd number. In the length of the second symbol, the terminal, or the sending unit 2 of the terminal, transmits the UCI on all PRBs in the PRB group. The DMRS and the UCI each occupy all 12 subcarriers of an entire PRB for transmission. If M is an odd number, a ratio of a quantity of PRBs used to transmit the DMRS to a quantity of PRBs used to transmit the UCI may be 1:5.

In still another example, on the first symbol, the DMRS may be transmitted by using the target PRB, the DMRS may be transmitted by using some subcarriers of another PRB, and the UCI may be transmitted by using the other subcarriers. However, on the second symbol, the UCI is transmitted by using the target PRB, the DMRS is transmitted by using some subcarriers of another PRB, and the UCI is transmitted by using the other subcarriers. For example, for details, refer to FIG. 7g, FIG. 7h, and FIG. 7i.

Considering forward compatibility, in another embodiment of this application, null subcarriers may be reserved on a PRB allocated to the control channel.

Figure 8:
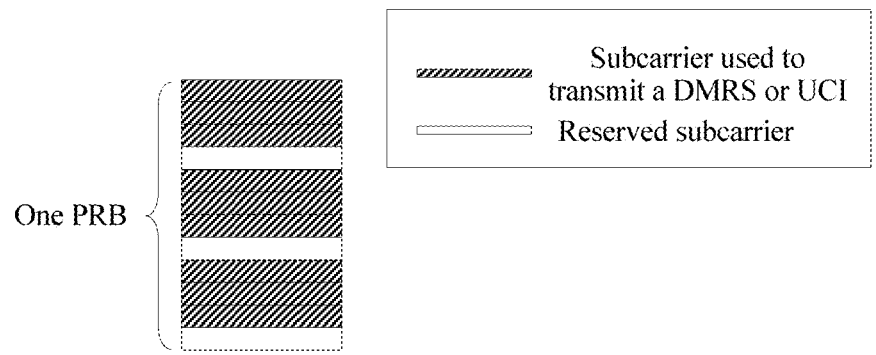
Figure 9A:
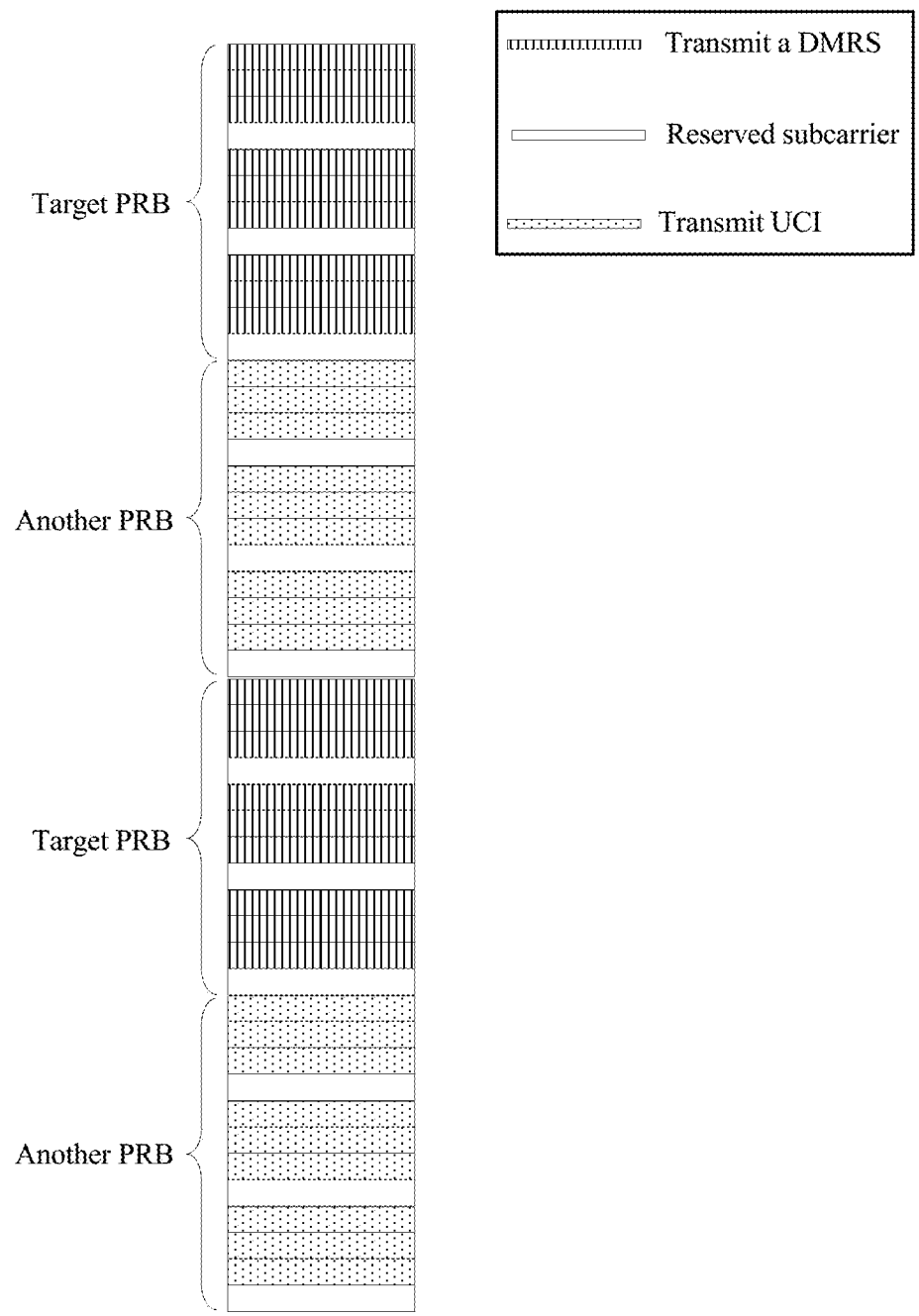
Figure 9B:
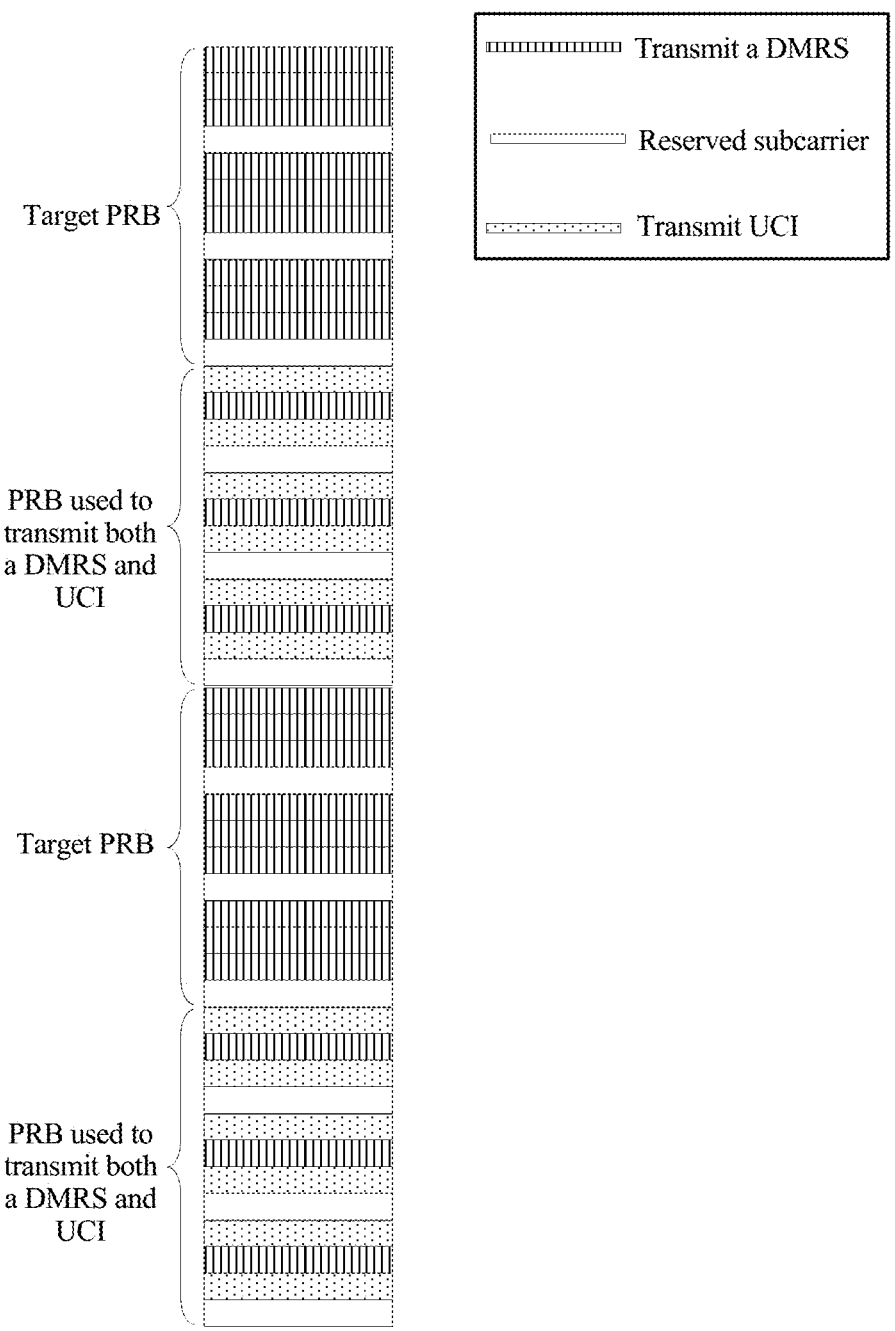
Figure 9C:
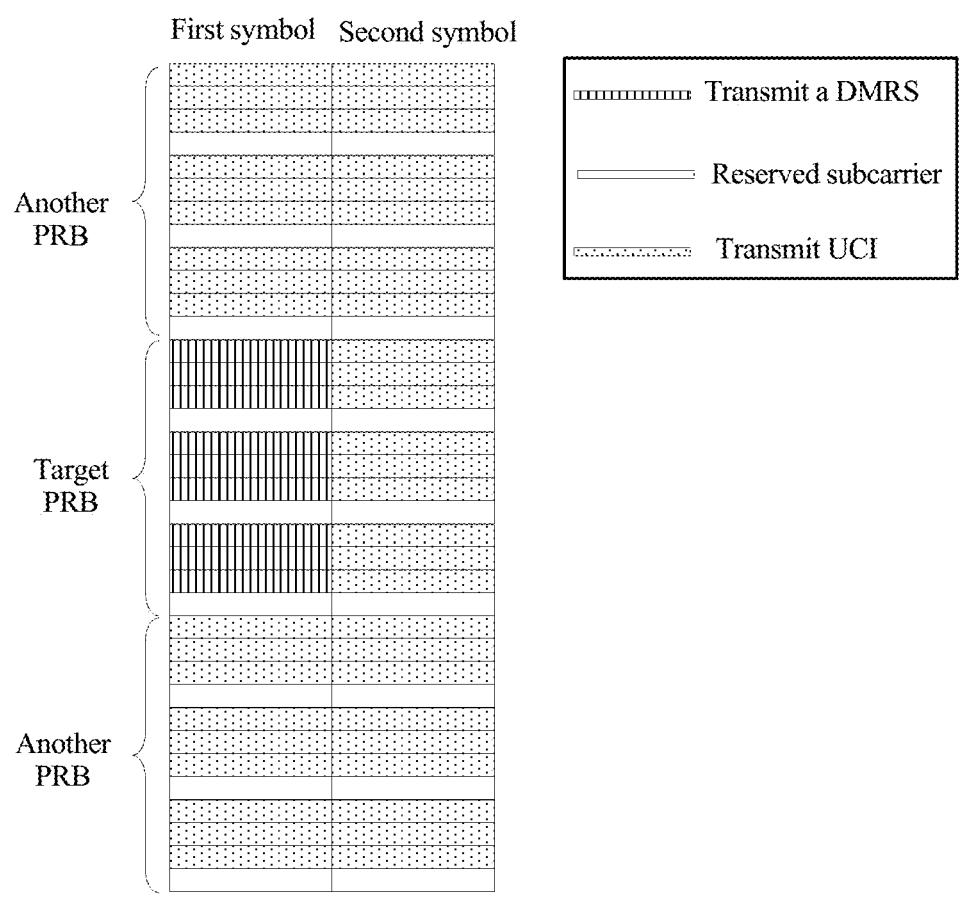
Figure 9D:
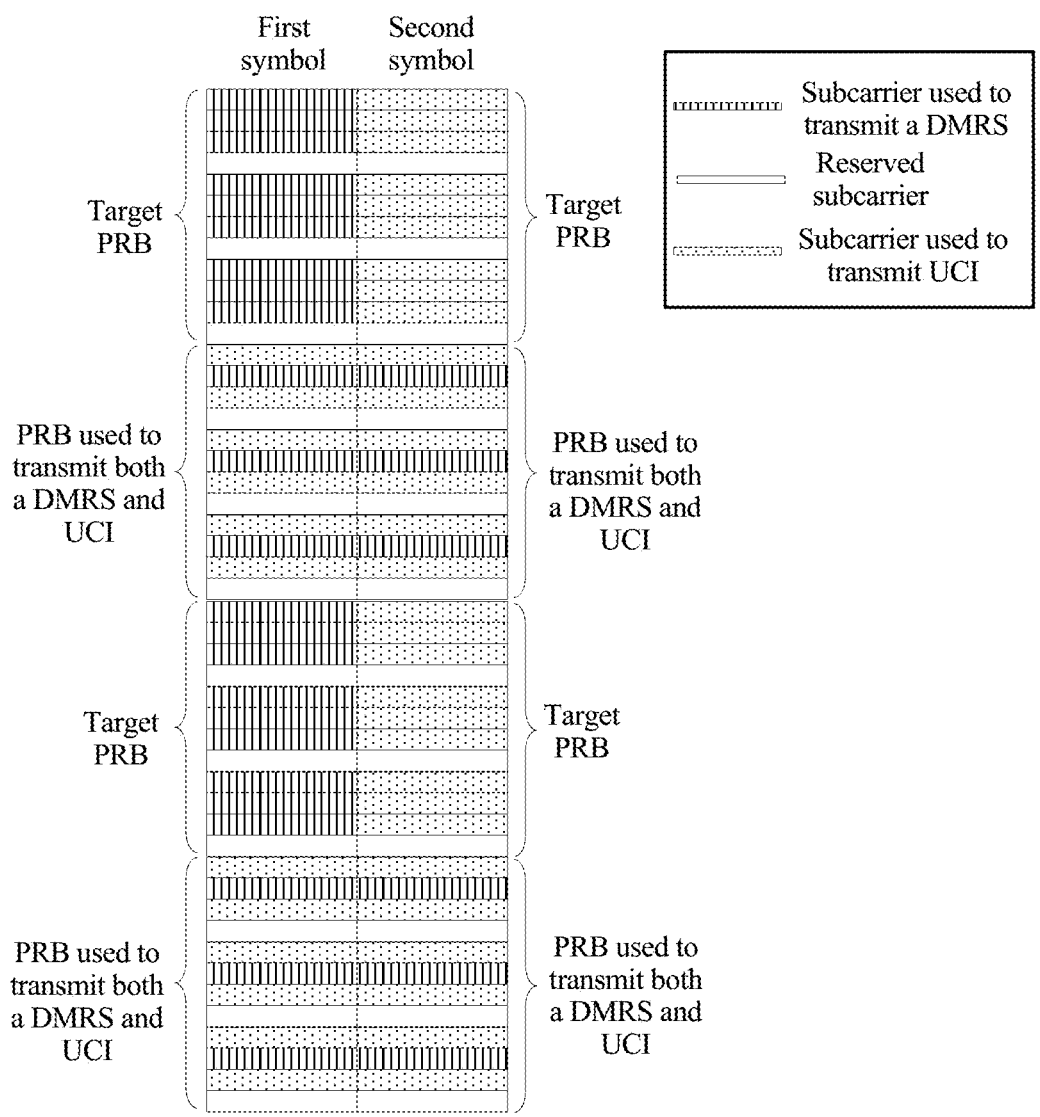

In an example, a spacing between the reserved subcarriers may be (15×P) kHz (P is a positive integer). An example in which P=4 is used. Referring to FIG. 8, one subcarrier may be reserved for every four subcarriers in 12 subcarriers of one PRB. In this case, three subcarriers may be reserved on the PRB in total.

Figure 10A:
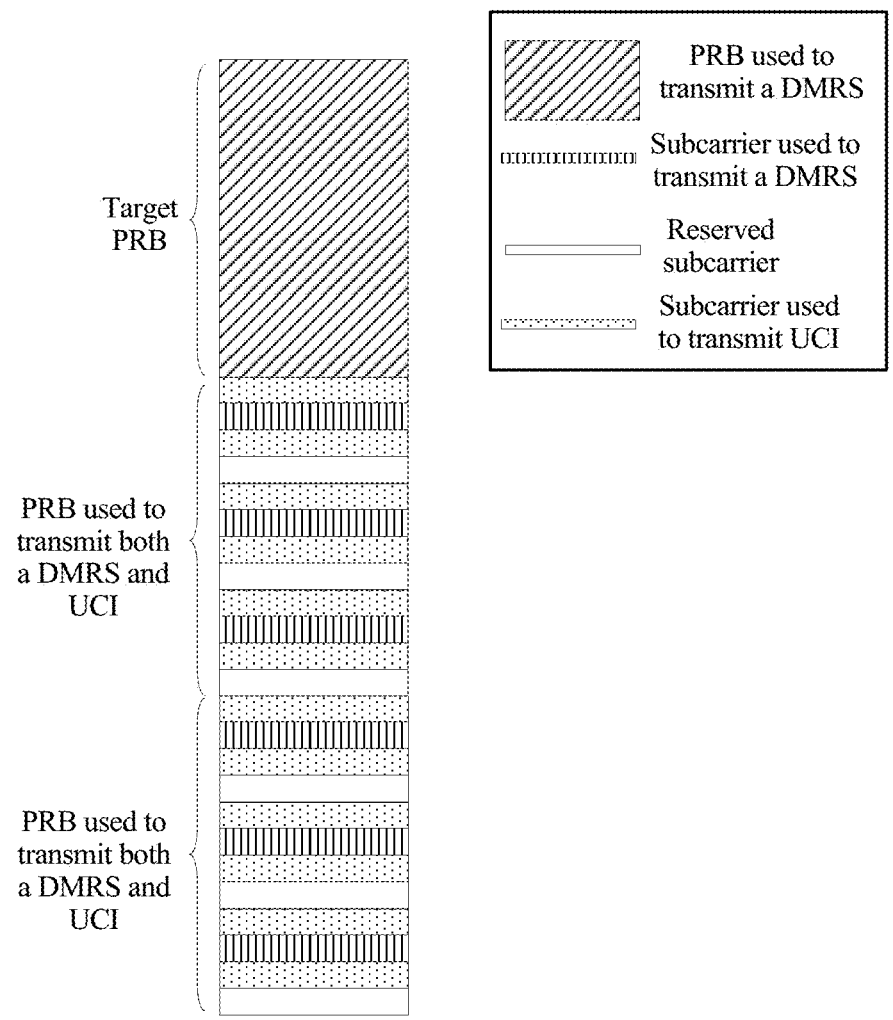
Figure 10B:
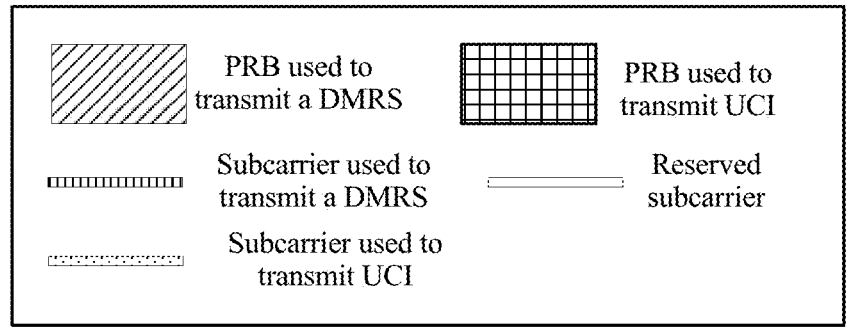
Figure 10B:
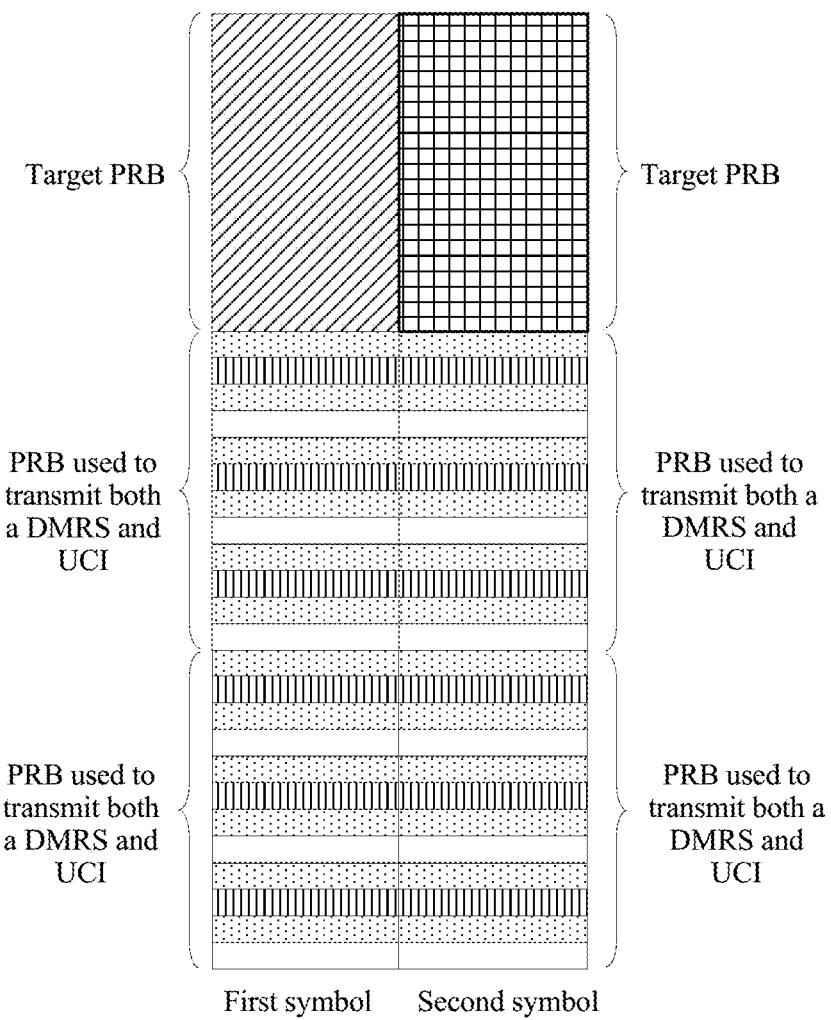

With reference to the foregoing distribution structures, in each distribution structure described above, subcarriers may be reserved on each PRB (for example, for details, refer to FIG. 9a to FIG. 9d), or subcarriers may be reserved on the target PRB, or subcarriers may be reserved on a PRB other than the target PRB, or subcarriers may be reserved on a PRB on which some subcarriers are used to transmit the DMRS and the other subcarriers are used to transmit the UCI (for example, for details, refer to FIG. 10a and FIG. 10b).

The reserved subcarriers may be used by the terminal or another terminal to transmit a signal. For example, the reserved subcarriers may be used to transmit the DMRS or the UCI of the terminal or the another terminal. Certainly, some of the reserved subcarriers may be used to transmit the DMRS, and the other reserved subcarriers may be used to transmit the UCI.

A PRB on which subcarriers are reserved and a spacing between the reserved subcarriers may be predefined, for example, may be specified in a protocol. Certainly, the base station may configure this for the terminal according to an actual situation by using signalling.

Optionally, the terminal may increase transmission power of each subcarrier on a PRB on which subcarriers are reserved. As instructed by the base station or specified in a standard, the terminal may increase, through power allocation or in another manner, the transmission power of each subcarrier on the PRB on which the subcarriers are reserved.

A person skilled in the art may understand that in all the embodiments mentioned above, the first symbol and the second symbol may be interchanged.

In another embodiment of the present invention, in a length of a symbol, a signal is repeatedly transmitted P times in time domain by using the subcarriers reserved in all the embodiments.

Figure 11:
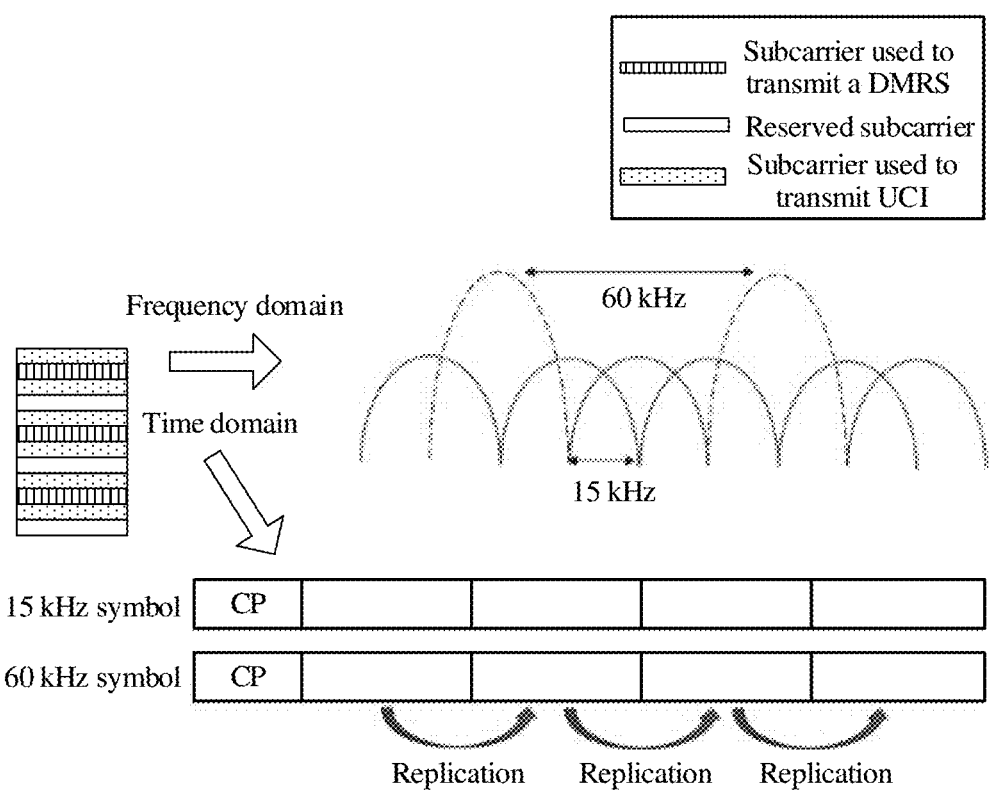
FIG. 11 is an example diagram of repeated transmission according to an embodiment of this application.

As shown in FIG. 11, it is assumed that the subcarrier spacing between the reserved subcarriers is 60 kHz. To transmit a symbol with a 15 kHz subcarrier spacing and a symbol with a 60 kHz subcarrier spacing by using same duration in time domain. In duration of the symbol with the 15 kHz subcarrier spacing, the symbol with the 60 kHz subcarrier spacing may be repeatedly transmitted (or replicated) four times, so that a total length of the symbol with the 60 kHz subcarrier spacing is the same as the duration of the symbol with the 15 kHz subcarrier spacing.

However, on the receiving side, the base station receives the symbol repeatedly transmitted four times, and processes the symbol, to obtain information carried on a service of the 60 kHz subcarrier spacing.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A control channel transmission method comprising:
   receiving, by a first device, configuration information, wherein the configuration information indicates a time-frequency resource configured for a control channel,
   wherein the time-frequency resource comprises N symbols and M physical resource blocks (PRBs),
   wherein N is greater than or equal to 1 and less than or equal to 12,
   wherein M is greater than or equal to 1,
   wherein the control channel comprises a demodulation reference signal (DMRS) and uplink control information (UCI),
   wherein the N symbols comprise at least a first symbol, and
   wherein the M PRBs are contiguous or non-contiguous;
   transmitting the DMRS on at least one of the N symbols using a target PRB,
   wherein the target PRB comprises at least one of the M PRBs, and
   wherein transmitting the DMRS on the at least one of the N symbols using the target PRB comprises:
      transmitting, in a length of the first symbol, the UCI using one or more first subcarriers of another PRB; and
      transmitting the DMRS using one or more second subcarriers of the another PRB other than the one or more first subcarriers,
      wherein the another PRB comprises at least one of the M PRBs other than the target PRB; and
      repeatedly transmitting, P times, using reserved subcarriers reserved on at least one PRB, a signal in a time domain and in a time period having a length that is the same as a time period as in which a symbol is transmitted, wherein P is a positive integer.

2. The method according to claim 1,
   wherein the transmitting the DMRS on the at least one of the N symbols further comprises:
      performing, in response to the N symbols comprising a second symbol:
         transmitting, using the target PRB, at least one of the UCI or the DMRS in a time period having a length that is the same as a length of a time period in which the second symbol is transmitted.

3. The method according to claim 2, wherein the transmitting the at least one of the UCI or the DMRS in the length of the second symbol using the target PRB further comprises:
   transmitting, in the length of the second symbol, the UCI using the one or more first subcarriers of the another PRB; and transmitting the DMRS using the one or more second subcarriers.

4. The method according to claim 2, wherein the method further comprises:
   transmitting the UCI in the length of the first symbol by using a PRB contiguous to the target PRB.

5. The method according to claim 2, wherein the M PRBs are divided into at least one PRB group, and wherein the at least one PRB group is contiguous or non-contiguous in a frequency domain; and
   wherein the method further comprises:
      transmitting the UCI in the length of the first symbol by using at least one PRB other than the target PRB in the at least one PRB group.

6. The method according to claim 1, further comprising reserving the subcarriers on the at least one PRB.

7. The method according to claim 6, wherein a spacing between the reserved subcarriers is (15×P) kHz, wherein P is a positive integer.

8. The method according to claim 1, further comprising:
performing spectrum spreading on the DMRS using a first spreading sequence that is orthogonal to a spreading sequence used by a neighboring cell; and
performing spectrum spreading on the UCI by using a second spreading sequence that is orthogonal to the spreading sequence used by the neighboring cell, wherein the first spreading sequence and the second spreading sequence are the same or different, and wherein the first spreading sequence and the second spreading sequence are specified by a second device.

9. A control channel transmission method comprising:
generating, by a second device, and
sending, to a first device, configuration information, wherein the configuration information indicates a time-frequency resource configured for a control channel, wherein the time-frequency resource comprises N symbols and M physical resource blocks (PRBs), wherein N greater than or equal to 1 and less than or equal to 12,
wherein M greater than or equal to 1,
wherein the N symbols comprise at least a first symbol, and
wherein the M PRBs are contiguous or non-contiguous; receiving the control channel on the time-frequency resource,
wherein the control channel comprises a demodulation reference signal (DMRS) and uplink control information (UCI), the DMRS is transmitted using at least one of the N symbols and a target PRB,
wherein the target PRB comprises at least one of the M PRBs, and
wherein the receiving the control channel on the time-frequency resource comprises:
receiving, in the length of the first symbol, the UCI on one or more first subcarriers of another PRB; and
receiving the DMRS on one or more second subcarriers of the another PRB other than the one or more first subcarriers, wherein the another PRB comprises at least one of the M PRBs other than the target PRB; and
receiving, in a time period having a length that is the same as a time period as in which a symbol is transmitted, a signal that is repeatedly transmitted P times in a time domain using reserved subcarriers.

10. The method according to claim 9,
wherein the receiving the control channel on the time-frequency resource further comprises performing, in response to the N symbols comprising a second symbol:
receiving at least one of the UCI or the DMRS on the target PRB in a time period having a length that is the same as a length of a time period in which the second symbol is transmitted.

11. The method according to claim 10, wherein the receiving the control channel on the time-frequency resource further comprises:
receiving, in the length of the second symbol, the UCI on some subcarriers of the another PRB, and receiving the DMRS on the other subcarriers.

12. The method according to claim 9, wherein the reserved subcarriers are reserved on at least one of the M PRBs.

13. The method according to claim 9, further comprising:
indicating, to the first device, a first spreading sequence and a second spreading sequence, wherein the first spreading sequence and the second spreading sequence each are orthogonal to a spreading sequence used by a neighboring cell, wherein the first spreading sequence is used by the first device to perform spectrum spreading on the DMRS, and the second spreading sequence is used by the first device to perform spectrum spreading on the UCI.

14. A control channel transmission device, comprising:
a processor; and
a non-transitory computer-readable storage medium storing a program to be executed by the processor, the program including instructions for:
receiving configuration information, wherein the configuration information indicates a time-frequency resource configured for a control channel,
wherein the time-frequency resource comprises N symbols and M physical resource blocks (PRBs),
wherein N is greater than or equal to 1 and less than or equal to 12,
wherein M is greater than or equal to 1,
wherein the control channel comprises a demodulation reference signal (DMRS) and uplink control information (UCI),
wherein the N symbols comprise at least a first symbol, and
wherein the M PRBs are contiguous or non-contiguous; transmitting the DMRS on at least one of the N symbols using a target PRB,
wherein the target PRB comprises at least one of the M PRBs, and
wherein the instructions for transmitting the DMRS on at least one of the N symbols includes instructions for:
transmitting, in the length of the first symbol, the UCI using one or more first subcarriers of another PRB; and
transmitting the DMRS using one or more second subcarriers of the another PRB other than the one or more first subcarriers, wherein the another PRB comprises at least one of the M PRBs other than the target PRB; and
repeatedly transmitting, P times, using reserved subcarriers reserved on at least one PRB, a signal in a time domain and in a time period having a length that is the same as a time period as in which a symbol is transmitted, wherein P is a positive integer.

15. The control channel transmission device according to claim 14,
wherein the instructions for transmitting the DMRS on at least one of the N symbols further include instructions for:
performing, in response to the N symbols comprising a second symbol:
transmitting, using the target PRB, at least one of the UCI or the DMRS in a time period having a length that is the same as a length of a time period in which the second symbol is transmitted.

16. The control channel transmission device according to claim 15, wherein the instructions for transmitting the at least one of the UCI or the DMRS in the length of the second symbol using the target PRB further include instructions for:

transmitting, in the length of the second symbol, the UCI using the one or more first subcarriers of the another PRB; and transmitting the DMRS using the one or more second subcarriers.

\* \* \* \* \*